US 12,473,670 B2

(12) United States Patent
Yu et al.

(10) Patent No.: US 12,473,670 B2
(45) Date of Patent: Nov. 18, 2025

(54) WOVEN QUADRILATERAL MESH ORIGAMI STRUCTURES AND RELATED FUNCTIONAL MATERIALS

(71) Applicant: The Hong Kong University of Science and Technology, Kowloon (HK)

(72) Inventors: Hongyu Yu, Kowloon (HK); Yongkai Li, Sai Kung (HK); Xingru Chen, Sai Kung (HK)

(73) Assignee: The Hong Kong University of Science and Technology, Kowloon (HK)

( * ) Notice: Subject to any disclaimer, the term of this patent is extended or adjusted under 35 U.S.C. 154(b) by 0 days.

(21) Appl. No.: 18/650,177

(22) Filed: Apr. 30, 2024

(65) Prior Publication Data

US 2024/0384447 A1 Nov. 21, 2024

Related U.S. Application Data

(60) Provisional application No. 63/502,421, filed on May 16, 2023.

(51) Int. Cl.
*D03D 15/46* (2021.01)
*D03D 7/00* (2006.01)
(Continued)

(52) U.S. Cl.
CPC .............. *D03D 25/005* (2013.01); *D03D 7/00* (2013.01); *G10K 11/36* (2013.01)

(58) Field of Classification Search
CPC .......... D03D 25/005; D03D 7/00; D03D 3/08; D03D 13/004; D03D 15/65; G10K 11/36; B44C 5/00; B31D 5/00; B31D 5/04
See application file for complete search history.

(56) References Cited

U.S. PATENT DOCUMENTS

| 943,442 | A | * | 12/1909 | McClatchey | .......... A47C 23/30 |
| | | | | | 5/199 |
| 1,056,108 | A | * | 3/1913 | Lunken | .................. A47H 23/04 |
| | | | | | 160/237 |

(Continued)

FOREIGN PATENT DOCUMENTS

| CN | 101233286 A | 7/2008 |
| CN | 104376133 A | 2/2015 |

(Continued)

OTHER PUBLICATIONS

Sareh, P., "The Least Symmetric Crystallographic Derivative of the Developable Double Corrugation Surface: Computational Design Using Underlying Conic and Cubic Curves," Mater. Des., vol. 183, Art. No. 108128, Dec. 5, 2019. https://doi.org/10.1016/j.matdes.2019.108128.

(Continued)

*Primary Examiner* — Robert H Muromoto, Jr.
(74) *Attorney, Agent, or Firm* — Amin, Turocy & Watson, LLP

(57) ABSTRACT

A woven quadrilateral mesh origami structure includes first linear sections of a foldable material positioned in a first orientation, the first linear sections including first creases formed into the first linear sections that define first quadrilateral segments of the first linear sections; and second linear sections of the foldable material that are positioned in a second orientation that is not the first orientation and placed adjacent to first surfaces of alternating sections of the first linear sections and second surfaces, opposite the first surfaces, of other sections, other than the alternating sections, of the first linear sections. The second linear sections include second creases formed into the second linear sections that define second quadrilateral segments of the second linear sections, and the first quadrilateral segments of the first (Continued)

linear sections and the second quadrilateral segments of the second linear sections form a tessellated mesh structure.

20 Claims, 20 Drawing Sheets

(51) Int. Cl.
    *D03D 25/00* (2006.01)
    *G10K 11/36* (2006.01)

(56) References Cited

U.S. PATENT DOCUMENTS

| | | | |
|---|---|---|---|
| 2,245,540 A * | 6/1941 | Barr | D03D 3/005 |
| | | | 188/251 A |
| 2,416,747 A * | 3/1947 | Geimer | B65D 29/00 |
| | | | 383/117 |
| 2,901,951 A | 9/1959 | Hochfeld | |
| 2,925,650 A * | 2/1960 | Pall | B21F 33/00 |
| | | | 428/605 |
| 3,007,579 A * | 11/1961 | Pall | B01D 29/232 |
| | | | 210/493.1 |
| 4,785,909 A * | 11/1988 | Young | F01N 1/10 |
| | | | 181/258 |
| 4,981,732 A | 1/1991 | Hoberman | |
| 5,234,727 A | 8/1993 | Hoberman | |
| 5,340,627 A * | 8/1994 | Cockrell | B32B 38/00 |
| | | | 428/542.2 |
| 5,947,885 A | 9/1999 | Paterson | |
| 7,185,678 B1 * | 3/2007 | Stell | F02K 1/827 |
| | | | 138/41 |
| 7,805,213 B2 | 9/2010 | Schwenn | |
| 9,690,286 B2 | 6/2017 | Hovsepian et al. | |
| 10,099,887 B2 | 10/2018 | Kling | |
| 10,153,519 B2 * | 12/2018 | Jiang | H01M 50/136 |
| 10,418,664 B2 * | 9/2019 | Jiang | H01M 4/525 |
| 10,502,991 B2 * | 12/2019 | Yu | G02F 1/133305 |
| 10,660,200 B2 * | 5/2020 | Jiang | H01M 50/51 |
| 10,821,654 B2 | 11/2020 | Martinez-Duarte et al. | |
| 10,875,273 B2 | 12/2020 | Tachi et al. | |
| 11,056,791 B2 * | 7/2021 | Zekios | H01Q 9/065 |
| 11,433,633 B2 | 9/2022 | Calisch et al. | |
| 11,700,763 B2 * | 7/2023 | Yu | H01L 25/0753 |
| | | | 257/40 |
| 2002/0053400 A1 * | 5/2002 | Lorenz | B29C 70/30 |
| | | | 156/313 |
| 2010/0106239 A1 | 4/2010 | Roeder | |
| 2014/0110049 A1 * | 4/2014 | Yuen | H01L 23/373 |
| | | | 156/60 |
| 2015/0302772 A1 * | 10/2015 | Yu | G06F 3/016 |
| | | | 156/278 |
| 2015/0342050 A1 * | 11/2015 | Jiang | H05K 1/181 |
| | | | 361/749 |
| 2016/0231784 A1 * | 8/2016 | Yu | G02F 1/133305 |
| 2017/0197242 A1 * | 7/2017 | Kikuchi | B01D 39/12 |

FOREIGN PATENT DOCUMENTS

| | | |
|---|---|---|
| CN | 111173870 A | 5/2020 |
| CN | 112524471 B | 3/2022 |
| RU | 2303501 C2 | 7/2007 |

OTHER PUBLICATIONS

Tachi, T. and Miura, K., "Rigid-Foldable Cylinders and Cells," Journal of the IASS, vol. 53, No. 4, pp. 217-226, Dec. 2012.

Tachi, T., "Generalization of Rigid-Foldable Quadrilateral-Mesh Origami," presented at the Symposium of the International Association for Shell and Spatial Structures, Valencia, Spain, Sep. 28-Oct. 2, 2009. Available: http://hdl.handle.net/10251/6828.

Dudte, L. H., Vouga, E., Tachi, T. and Mahadevan, L., "Programming Curvature Using Origami Tessellations," Nat. Mater., vol. 15, No. 5, pp. 583-588, May 2016. https://doi.org/10.1038/NMAT4540.

Pinson, M. B., et al., "Self-Folding Origami at Any Energy Scale," Nat. Commun., vol. 8, Art. No. 15477, May 2017. https://doi.org/10.1038/ncomms15477.

Song, Z., et al., "Origami Lithium-Ion Batteries," Nat. Commun., vol. 5, Art. No. 3140, Jan. 28, 2014. https://doi.org/10.1038/ncomms4140.

Cheng, Q., et al., "Folding Paper-Based Lithium-Ion Batteries for Higher Areal Energy Densities," Nano Lett., vol. 13, No. 10, pp. 4969-4974, Sep. 23, 2013. https://doi.org/10.1021/nl4030374.

Lynd, D. T. and Harne, R. L., "Strategies to Predict Radiated Sound Fields from Foldable, Miura-Ori-Based Transducers for Acoustic Beamfolding," J. Acoust. Soc. Am., vol. 141, No. 1, pp. 480-489, Jan. 2017. https://doi.org/10.1121/1.4974204.

Tang, R., et al., "Origami-Enabled Deformable Silicon Solar Cells," Appl. Phys. Lett., vol. 104, No. 8, Art. No. 083501, Feb. 24, 2014. https://doi.org/10.1063/1.4866145.

Miura, K., "The Application of Origami Science to Map and Atlas Design," in Origami^3: Third International Meeting of Origami Science, Mathematics, and Education, T. C. Hull, Ed. Natick, Massachusetts, United States: A. K. Peters, 2002, pp. 137-145.

Klett, Y. and Middendorf, P., "Kinematic Analysis of Congruent Multilayer Tessellations," J. Mech. Robot., vol. 8, No. 3, 2016. https://doi.org/10.1115/1.4032203.

Lang, R. J., Twists, Tilings, and Tessellations: Mathematical Methods for Geometric Origami, 1st ed. Boca Raton, Florida, United States: CRC Press, 2018, p. 757.

Miura, K., "New Structural Form of Sandwich Core," J. Aircr., vol. 12, No. 5, pp. 437-441, May 1975. https://doi.org/10.2514/3.44468.

Fang, H., Li, S. and Wang, K. W., "Self-Locking Degree-4 Vertex Origami Structures," Proc. Math. Phys. Eng. Sci., vol. 472, No. 2195, Art. No. 20160682, Nov. 1, 2016. https://doi.org/10.1098/rspa.2016.0682.

Pratapa, P. P., Liu, K., Vasudevan, S. P. and Paulino, G. H., "Reprogrammable Kinematic Branches in Tessellated Origami Structures," J. Mech. Robot., vol. 13, No. 3, Art. No. 031004, Jun. 2021. https://doi.org/10.1115/1.4049949.

Dieleman, P., Vasmel, N., Waitukaitis, S. and van Hecke, M., "Jigsaw Puzzle Design of Pluripotent Origami," (in English), Nat. Phys., vol. 16, No. 1, pp. 63-68, Jan. 2020. https://doi.org/10.1038/s41567-019-0677-3.

Sareh, P. and Chen, Y., "Intrinsic Non-Flat-Foldability of Two-Tile DDC Surfaces Composed of Glide-Reflected Irregular Quadrilaterals," Int. J. Mech. Sci., vol. 185, Art. No. 105881, Nov. 1, 2020. https://doi.org/10.1016/j.ijmecsci.2020.105881.

Sareh, P. and Guest, S. D., "Design of Isomorphic Symmetric Descendants of the Miura-Ori," Smart Mater. Struct., vol. 24, No. 8, Art. No. 085001, Jun. 30, 2015. https://doi.org/10.1088/0964-1726/24/8/085001.

Wang, F., Gong, H. R., Chen, X. and Chen, C. Q., "Folding to Curved Surfaces: a Generalized Design Method and Mechanics of Origami-Based Cylindrical Structures," Sci. Rep., vol. 6, Art. No. 33312, Sep. 14, 2016. https://doi.org/10.1038/srep33312.

Schenk, M., Allwood, J. and Guest, S., "Cold Gas-Pressure Folding of Miura-Ori Sheets," presented at the International Conference on Technology of Plasticity, Aachen, Germany, 2011.

Fang, H., Li, S., Ji, H. and Wang, K., "Dynamics of a Bistable Miura-Origami Structure," Phys. Rev. E, vol. 95, No. 5, Art. No. 052211, May 17, 2017. https://doi.org/10.1103/PhysRevE.95.052211.

Fang, H., Li, S., Thota, M. and Wang, K.-W., "Origami Lattices and Folding-Induced Lattice Transformations," Phys. Rev. Res., vol. 1, No. 2, Art. No. 023010, Sep. 9, 2019. https://doi.org/10.1103/PhysRevResearch.1.023010.

Fang, H., Li, S., Ji, H. and Wang, K., "Uncovering the Deformation Mechanisms of Origami Metamaterials by Introducing Generic Degree-Four Vertices," Phys. Rev. E, vol. 94, No. 4, Art. No. 043002, Oct. 24, 2016. https://doi.org/10.1103/PhysRevE.94.043002.

Fang, H., Wang, K. W. and Li, S., "Asymmetric Energy Barrier and Mechanical Diode Effect from Folding Multi-Stable Stacked-Origami," Extreme Mech. Lett., vol. 17, pp. 7-15, Nov. 2017. https://doi.org/10.1016/j.eml.2017.09.008.

(56) References Cited

OTHER PUBLICATIONS

Fang, H., Chu, S.-C. A. and Wang, K. W., "Self-Locking Origami Structures and Locking-Induced Piecewise Stiffness," presented at the ASME 2017 International Design Engineering Technical Conferences and Computers and Information in Engineering Conference, Cleveland, Ohio, United states, Aug. 6-9, 2017. https://doi.org/10.1115/DETC2017-67197.

Xia, Y., Fang, H. and Wang, K. W., "Exploring the Dynamic Characteristics of Degree-4 Vertex Origami Metamaterials," presented at the ASME 2017 Conference on Smart Materials, Adaptive Structures and Intelligent Systems, Snowbird, Utah, United States, Sep. 18-20, 2017. https://doi.org/10.1115/SMASIS2017-3810.

Xiang, X., et al., "The Mechanical Characteristics of Graded Miura-Ori Metamaterials," Mater. Des., vol. 211, Art. No. 110173, Dec. 1, 2021. https://doi.org/10.1016/j.matdes.2021.110173.

Ma, J., Song, J. and Chen, Y., "An Origami-Inspired Structure with Graded Stiffness," Int. J. Mech. Sci., vol. 136, pp. 134-142, Feb. 2018. https://doi.org/10.1016/j.ijmecsci.2017.12.026.

Hou, Y., et al., "Miura-Ori Metastructure Enhanced Conductive Elastomers," Adv. Mater. Technol., vol. 5, No. 8, Art. No. 2000249, Aug. 2020. https://doi.org/10.1002/admt.202000249.

Wang, Y., et al., "Ultralight Metamaterial for Sound Absorption Based on Miura-Ori Tessellation Structures," Adv. Eng. Mater., p. 2100563, 2021. https://doi.org/10.1002/adem.202100563.

Guo, Y., et al., "Computational Generation and Conformal Fabrication of Woven Fabric Structures by Harmonic Foliation," Comput Methods Appl Mech Eng, vol. 363, Art. No. 112874, May 1, 2020. https://doi.org/10.1016/j.cma.2020.112874.

Luo, B., Ahmed, S. and Long, C., "Bamboos for Weaving and Relevant Traditional Knowledge in Sansui, Southwest China," J Ethnobiology Ethnomedicine, vol. 16, Art. No. 63, Oct. 20, 2020. https://doi.org/10.1186/s13002-020-00418-9.

Dyango Chavez Cutiño. (2020) Cardboard Attachment—Notches [Video]. Access Date: Mar. 6, 2023. Available: https://www.youtube.com/watch?v=LyWTDyxcgEc.

ArtTeacher Mrs. T. (2020) Cardboard Notching [Video]. Access Date: Mar. 6, 2023. Available: https://www.youtube.com/watch?v=RDRAKhBOBU.

Li, Y., et al., "Miura-Ori Enabled Stretchable Circuit Boards," npj Flex. Electron., vol. 5, No. 3, Feb. 15, 2021. https://doi.org/10.1038/s41528-021-00099-8.

Zhu, X., 竹编工艺 . Hangzhou, Zhejiang, China: Zhejiang Science and Technology Publishing House, 1983, p. 52. (in Chinese).

Yasuda, H., et al., "Folding Behaviour of Tachi-Miura Polyhedron Bellows," Proc. Math. Phys. Eng. Sci., vol. 469, No. 2159, Art. No. 20130351, Nov. 8, 2013. https://doi.org/10.1098/rspa.2013.0351.

Eidini, M. and Paulino, G. H., "Unraveling Metamaterial Properties in Zigzag-Base Folded Sheets," Sci. Adv., vol. 1, No. 8, Art. No. e1500224, Sep. 18, 2015. https://doi.org/10.1126/sciadv.1500224.

Adanur, S., Handbook of Weaving, 1st ed. Boca Raton, Florida, United States: CRC Press, 2000.

Lutfor Rahman Labu. (2019) Weaving for Beginner's: Shedding, Picking, Beating, Let-Off, Take-up (Weaving Loom Motion) [Video]. Access Date: Mar. 23, 2023. Available: https://www.youtube.com/watch?v=WYB0clbMCTg.

Wang-Iverson, et al., "Origami 5," Fifth International Meeting of Origami Science, Mathematics, and Education, © 2011 by Taylor & Francis Group, LLC.

Wang, et al., "Ultralight Metamaterial for Sound Absorption Based on Miura-Ori Tessellation Structures," Adv. Eng. Mater. 2021, 2100563, DOI: 10.1002/adem.202100563.

Xiang X M, Lu G, You Z. Energy absorption of origami inspired structures and materials[J]. Thin-Walled Structures, 2020, 157: 107130.

Chen Z, Wu T, Nian G, et al. Ron Resch origami pattern inspired energy absorption structures[J]. Journal of Applied Mechanics, 2019, 86(1): 011005.

Harne R L, Lynd D T. Origami acoustics: using principles of folding structural acoustics for simple and large focusing of sound energy[J]. Smart Materials and Structures, 2016, 25(8): 085031.

Yu X, Fang H, Cui F, et al. Origami-inspired foldable sound barrier designs[J]. Journal of Sound and Vibration, 2019, 442: 514-526.

\* cited by examiner

WOVEN QUADRILATERAL MESH ORIGAMI STRUCTURES AND RELATED FUNCTIONAL MATERIALS

CROSS-REFERENCE TO RELATED APPLICATIONS

The present application claims the benefit of priority to U.S. Provisional Patent Application No. 63/502,421, filed May 16, 2023, and entitled "Woven Quadrilateral Mesh Origami Structure, its Manufacturing Method and Related Functional Materials," the entirety of which application is incorporated herein by reference.

BACKGROUND

Origami, the Japanese art of paper folding, is a vibrant field with many different branches. One of these branches, tessellation, is a technique that has attracted the attention of researchers in both science and engineering. Origami tessellation is a technique that entails folding a single sheet of paper, or other foldable materials, to create intricate, repeating patterns on a plane without the need for separate sheets arranged side by side.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a device is described herein. The device can include first linear sections of a foldable material positioned in a first orientation, the first linear sections including first creases formed into the first linear sections that define first quadrilateral segments of the first linear sections. The device can further include second linear sections of the foldable material that are positioned in a second orientation that is not the first orientation and placed adjacent to first surfaces of alternating sections of the first linear sections and second surfaces, opposite the first surfaces, of other sections, other than the alternating sections, of the first linear sections. The second linear sections can include second creases formed into the second linear sections that define second quadrilateral segments of the second linear sections, and the first quadrilateral segments of the first linear sections and the second quadrilateral segments of the second linear sections can form a tessellated mesh structure.

In another implementation, a method is described herein. The method can include folding creases into strips of a foldable material, where the creases define quadrilateral segments of the strips. The method can further include arranging a first group of the strips in a first orientation. The method can also include weaving a second group of the strips, mutually exclusive with the first group, into the first group of the strips, resulting in the second group of the strips being arranged in a second orientation that is not the first orientation, and further resulting in the quadrilateral segments of the first group of the strips and the second group of the strips forming a tessellated mesh structure.

In an additional implementation, another method is described herein. The method can include attaching a tessellated quadrilateral mesh structure to a surface, the tessellated quadrilateral mesh structure including first co-aligned material segments and second co-aligned material segments woven into the first co-aligned material segments; and absorbing, via the tessellated quadrilateral mesh structure, sound waves impinging on the surface.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
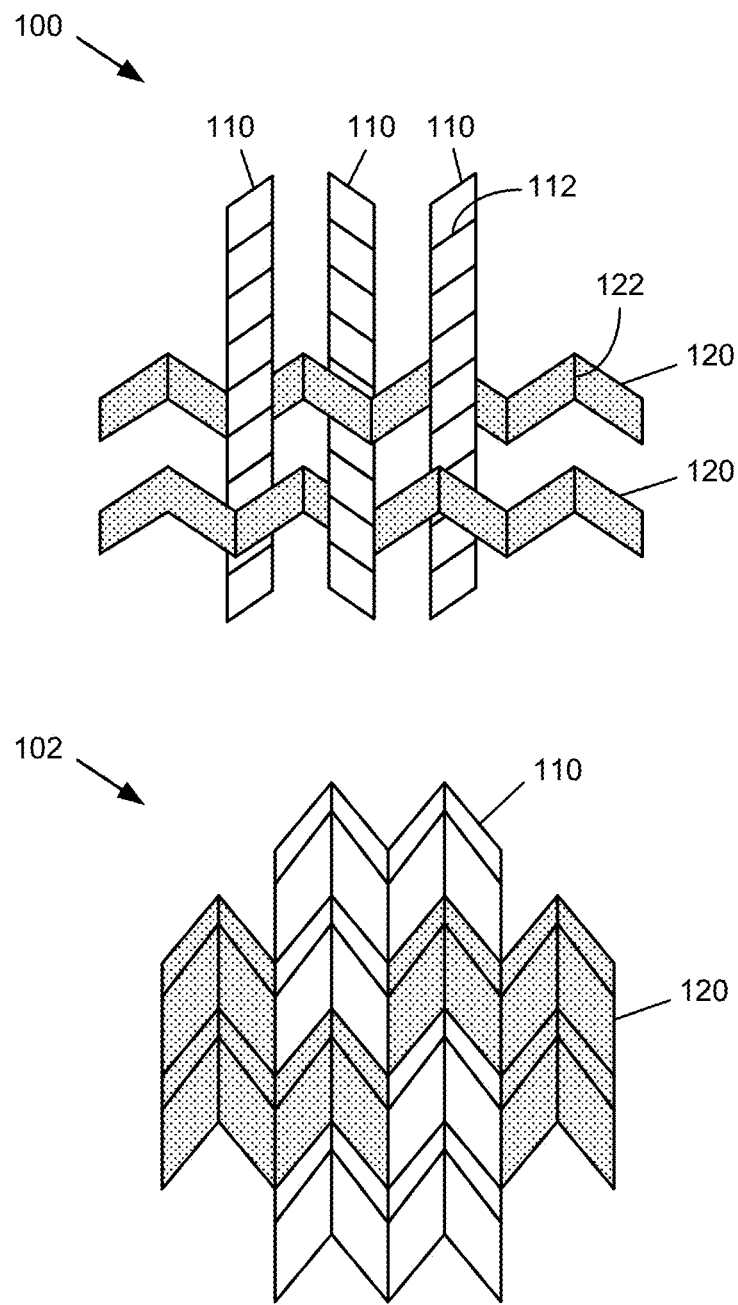
FIG. 1 is a diagram depicting an example woven quadrilateral mesh origami structure in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter. In addition, it is noted that the drawings provided herein are not drawn to scale, either within the same drawing or between different drawings, unless explicitly stated otherwise.

Described herein are woven quadrilateral mesh origami structures, techniques for producing and using such structures, and functional materials related to such structures. As noted above, origami tessellation is a technique that entails folding a single sheet of foldable material, such as paper or the like, to create intricate, repeating patterns on a plane without the need for separate sheets arranged side by side. Quadrilateral mesh origami is a type of origami tessellation that is based on a quadrilateral grid structure, with each face being a quadrilateral and each interior vertex having four creases converging upon it. These interior vertices are referred to herein as degree-4 vertices. One example of a quadrilateral-based structure is the Miura-ori, which features co-linear creases. Other quadrilateral-based mesh origami structures exist, such of which do not exhibit co-linear creases.

Forming an origami tessellation presents unique geometrical challenges due to the significant biaxial in-plane contraction of material sheets, which can necessitate specialized folding processes. For instance, a pre-gathering approach can be used to overcome challenges associated with coupled longitudinal and transverse contraction, in which sheet material is first folded into a singly corrugated sheet to create creased areas and then unfolded and folded into a final crease pattern. However, this approach is limited to crease patterns with collinear creases, such as Miura-ori. In contrast, generic quadrilateral mesh origami tessellations face difficulties with pre-folding. For instance, there is a step in origami tessellation called "collapse," in which multiple folds and vertices are coupled such that they move together. As a result, it can be necessary to fold all coupled folds and vertices simultaneously during pre-folding, which is nearly impossible in some implementations.

On the other hand, origami-based metamaterials can be engineered to attain specific mechanical properties through folding and unfolding, leveraging the principles of origami. These materials can be constructed, e.g., using a stack of multiple layers of quadrilateral mesh origami. By varying the lengths of these surfaces, different configurations, such as nested in or bulged out configurations, can be realized. However, from a manufacturing standpoint, binding creases from different layers in stacked DDC surfaces is challenging due to the existence of only point or line contacts.

Furthermore, origami tessellations hold promise in a wide range of applications, serving as an innovative and versatile approach to designing complex metamaterials with uses in fields such as engineering, architecture, fashion, art, and/or others. It is noted that the way these structures are arranged and combined can greatly influence the properties of the materials involved. For instance, the rigidity, flexibility, or responsiveness of a final product can be significantly impacted by the tessellation pattern used. This means that by carefully selecting and designing origami tessellations, it is possible to create materials with highly specific and customizable characteristics, opening up a world of possibilities for the development of advanced products and systems.

Various implementations described herein provide techniques facilitating woven-based quadrilateral mesh origami tessellation surfaces and related stacked structures. A process for constructing quadrilateral mesh origami tessellation surfaces as described herein includes a pre-creasing stage, in which strips of a foldable material are employed and folding is performed at the strip level. Subsequently, the strips can be interlaced through a woven approach to form the origami tessellation structure. This process serves to fully or partially decouple the coupled creases at the internal vertices, facilitating more precise and efficient folding.

As further described herein, surfaces of quadrilateral mesh origami tessellations can be sewn together to achieve combinations of multiple different corrugated surfaces. The resulting structure can be a stacked woven-based quadrilateral mesh origami tessellation surface.

As additionally described herein, example implementations of woven-based quadrilateral mesh origami tessellation surfaces are provided. While various examples of implementations are provided herein, it is noted that the examples provided herein are not intended to be an exhausting listing of the applications of woven-based structures as described herein, and that woven-based structures as described herein can be applied to any general use cases involving functional materials based on quadrilateral mesh origami tessellation surfaces and the related stacked structures.

As used herein, the term "origami" refers to the art of folding in which a flat sheet of a foldable material (e.g., paper, cardboard, plastic, and/or any other material(s) that can be formed into a sheet that is capable of being folded) is transformed into a three-dimensional shape through folding and sculpting techniques. The term "origami" as used herein can also refer to kirigami (in which a sheet is cut in addition to folded), or any other types of "-gami," including wet-folding, modular origami, or the like.

As further used herein, the term "origami tessellation" refers to a technique that involves folding a single sheet of a foldable material to create complex, repeating patterns on a plane, without using separate pieces of sheet material placed side by side. When unfolded, the term "crease/fold" refers to a fold made in a piece of sheet material to create a sharp or curved edge that helps define the shape of the final model. In origami tessellation, a "face/facet" refers to a flat polygonal shape formed by folding a sheet along crease lines. A crease region (or area) in origami refers to a line, area, ridge, or groove in a sheet that is made by folding, pressing, or wrinkling. In origami, the term "vertex" refers to the point where two or more creases meet in a fold, and a vertex can be located either in the interior or on the boundary of a sheet. A "degree-n vertex" refers to a point where n creases intersect, with each crease representing a folded edge in the paper. For example, a "degree-4 vertex" (D4V) represents the point where four creases intersect.

As additionally used herein, the term "surface" refers to a structure, e.g., resulting from unfolding, where all of the points on one side of the structure can be projected onto a plane without overlapping. Additionally, a "quadrilateral mesh" refers to a mesh in which all the faces are quadrilateral. The term "DDC" is an abbreviation for "developable double corrugated," where "developable" refers to a structure that can be fully unfolded into a plane, "double" refers to a structure that expands in two directions during the folding and unfolding process, and "corrugated" refers to a surface including a pattern of alternating ridges and grooves that can be used for strengthening, insulation, or other purposes.

With reference now to the drawings, FIG. 1 is a diagram depicting an example woven quadrilateral mesh origami structure 100 that can be used in accordance with various implementations described herein. In implementations, the structure 100 shown in FIG. 1 can be used as part of a device, e.g., a device that includes one or more surfaces that are produced according to the structure 100. Non-limiting examples of devices that can incorporate the structure 100 as shown in FIG. 1 are described in further detail below.

As shown in FIG. 1, the structure 100 can include first linear sections 110 of a foldable material (e.g., paper, plastic, metal sheets or foils, fabrics, and/or any other material that can be formed into a foldable sheet) that are positioned in a first orientation. While each of the first linear sections 110 shown in FIG. 1 are parallel to (or co-linear with) each other, it is noted that the orientation of the first linear sections 110 could vary from each other, e.g., by a fixed value or a variable value such as a tolerance, in some implementations. As further shown by FIG. 1, the first linear sections 110 include first creases 112 that are formed into the first linear sections 110. These first creases 112 define first quadrilateral segments of the first linear sections 110. While the quadrilateral segments shown in FIG. 1 are parallelograms, it is noted that other types of quadrilaterals, such as squares or rectangles, trapezoids, and/or other any other quadrilateral shapes that can be utilized to form a tessellation via a single shape or multiple shapes, could also be used.

The structure 100 shown in FIG. 1 further includes second linear sections 120 of the foldable material, which are positioned in a second orientation that is not the first orientation. It is noted that, in some implementations, respective ones of the first linear sections 110 and/or the second linear sections 120 could be composed of the same material and/or different materials. By way of example, in some implementations, the first linear sections 110 could be made of a first material while the second linear sections 120 could be made of a second, different material. In other examples, a first one of the first linear sections 110 (or second linear sections 120) could be made of a first material, and a second one of the first linear sections 110 (or second linear sections 120) could be made of a second, different material.

Similar to the first linear sections 110 as described above, respective ones of the second linear sections 120 can be parallel to (or co-linear with) each other, and/or vary in orientation by a fixed or variable amount, as appropriate for a given implementation. Additionally, while FIG. 1 illustrates an example in which the orientation of the first linear sections 110 is perpendicular to the orientation of the second linear sections 120, it is noted that the difference in orientation between the first linear sections 110 and second linear sections 120 could differ by any suitable amount. Also or alternatively, the first linear sections 110 could be substantially perpendicular to the second linear sections 120, which is defined herein as meeting at an angle that is 90 degrees plus or minus a tolerance value.

In the example shown by the structure 100, the second linear sections 120 can be woven into the first linear sections 110, e.g., such that the second linear sections 120 are placed adjacent to first surfaces (e.g., front surfaces, with reference to the view shown in FIG. 1) of alternating sections of the first linear sections 110 and second surfaces (e.g., back surfaces, with reference to the view shown in FIG. 1), opposite the first surfaces, of other sections, other than the alternating sections, of the first linear sections 110. Stated another way, the second linear sections 120 can be fed and/or otherwise positioned through the first linear sections 110 such that the second linear sections 120 alternate between being placed in front of, and behind, respective ones of the first linear sections 110.

As further shown in FIG. 1, the second linear sections 120 of the structure 100 can have second creases 122 that, similarly to the first creases 112 of the first linear sections 110, define second quadrilateral segments of the second linear sections 120. The quadrilateral segments of the second linear sections 120 resulting from the second creases 122 can be of a same shape as the first quadrilateral segments of the first linear sections 110, e.g., as shown in FIG. 1, or alternatively the second quadrilateral segments can be of a different shape from the first quadrilateral segments, provided that each segment is a quadrilateral.

As additionally shown in FIG. 1, the first linear sections 110 can differ in shape from the second linear sections 120, e.g., such that the second linear sections 120 exhibit a zig-zag shape while the first linear sections 110 remain straight and are characterized by inclined creases 112. In the example shown by FIG. 1, each of the creases 112 of the first linear sections 110 can correspond (e.g., in angle, shape, etc.) to the edges of the second linear sections 120. It is noted, however, that other shapes and/or crease configurations could also be used.

As will be described in further detail below, the first linear sections 110 and the second linear sections 120 can be combined such that the quadrilateral segments of the first linear sections 110 and the second linear sections 120 form a tessellated mesh structure 102. It is noted that the tessellated mesh structure 102 shown in FIG. 1 is intended merely as a simple example of a structure that can be formed via the first linear sections 110 and the second linear sections 120, and that other structures could also be constructed, as will be described in further detail herein. The resulting tessellated mesh structure 102 can be utilized in a variety of applications, such as structural reinforcement, sound absorption and/or soundproofing, and/or other uses, as will also be described in further detail herein.

Quadrilateral Mesh Origami Tessellation Surfaces Through Woven Designs

Various implementations described herein apply a woven concept to quadrilateral mesh origami. The pre-gathering approach involves decoupling creases during the pre-folding process to avoid interference between folds. As described herein, woven designs are utilized to address the same folding challenges by decoupling the folds. Woven origami design as described herein has similarities to weaving in traditional fabrics, in which two interlaced sets of threads, called warps and wefts, are used. Moreover, it is noted that one-dimensional lines can be extended to two-dimensional surfaces, such as in bamboo weaving and leather weaving, where the intersection angle can also be other than a right angle. Thus, as shown in FIG. 2, there are geometric similarities between a weaving structure 11 and a quadrilateral mesh origami tessellation 12.

Figure 2:
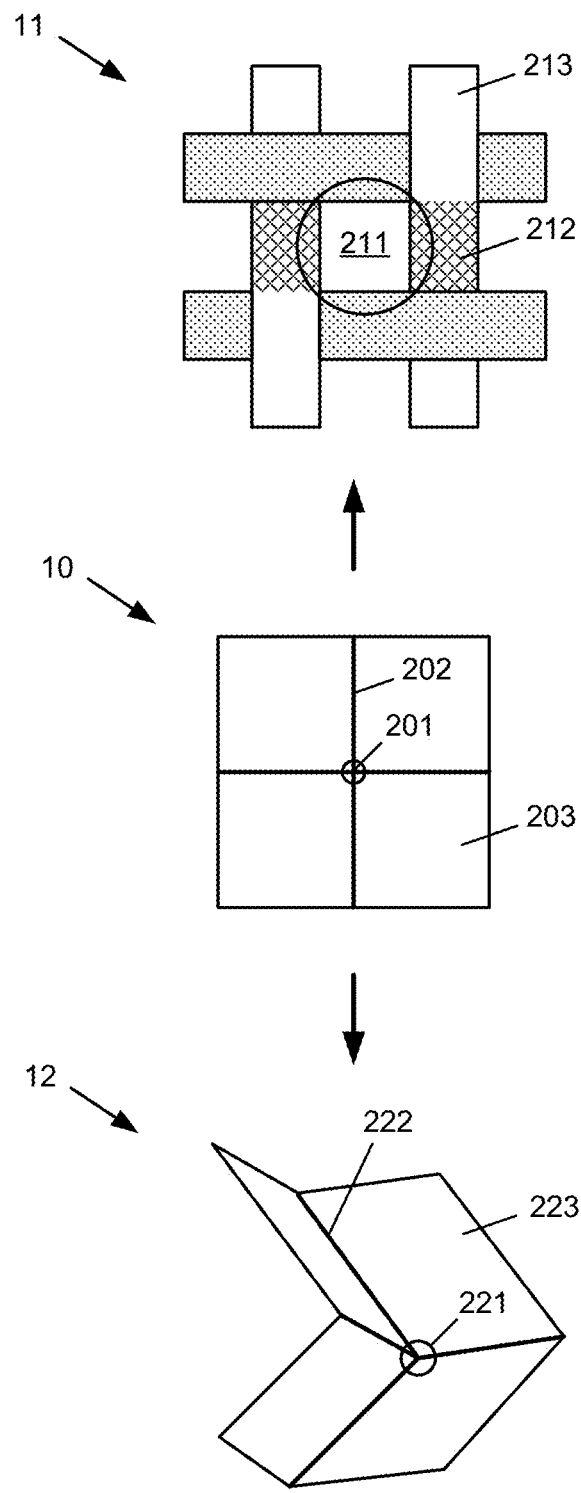
FIG. 2 is a diagram depicting an example strip weaving and quadrilateral mesh origami technique in accordance with various implementations described herein.
Figure 3:
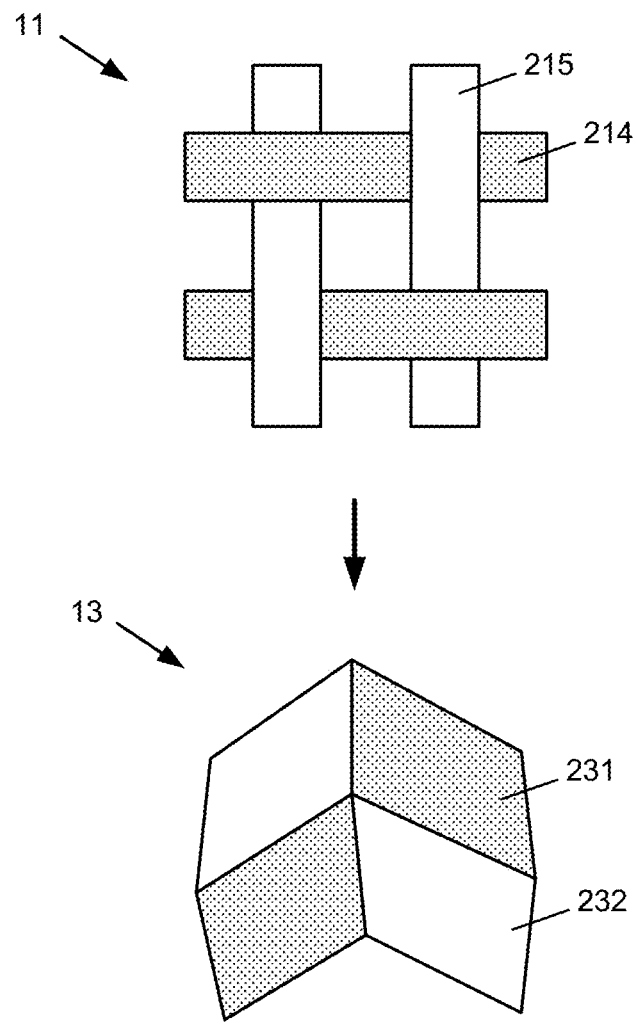
FIG. 3 is a diagram depicting a partially folded unit cell achieved through a woven design in accordance with various implementations described herein.

In FIG. 2, a quadrilateral mesh structure 10 is shown, which has similarities to a weaving structure 11 and a cell of a quadrilateral mesh origami tessellation 12 that is composed of four quadrilaterals. By way of example, point 201 in the geometric structure 10 can be analogous to a hole 211 in the weaving structure 11 and a degree-4 vertex 221 in the quadrilateral mesh origami 12; lines 202 in the geometric structure 10 can be analogous to areas without overlapped strips 212 in the weaving structure 11 and creases or folds 222 in the quadrilateral mesh origami 12; and faces 203 in the geometric structure 10 can be analogous to areas with overlapped strips 213 in the weaving structure 11 and facets or faces 223 in the quadrilateral mesh origami 12. As further shown in FIG. 3, wefts 214 and warps 215 in a weaving structure 11 can be analogous to weft strips 231 and warp strips 232 in a quadrilateral mesh origami, e.g., through a woven design 13.

Figure 4:
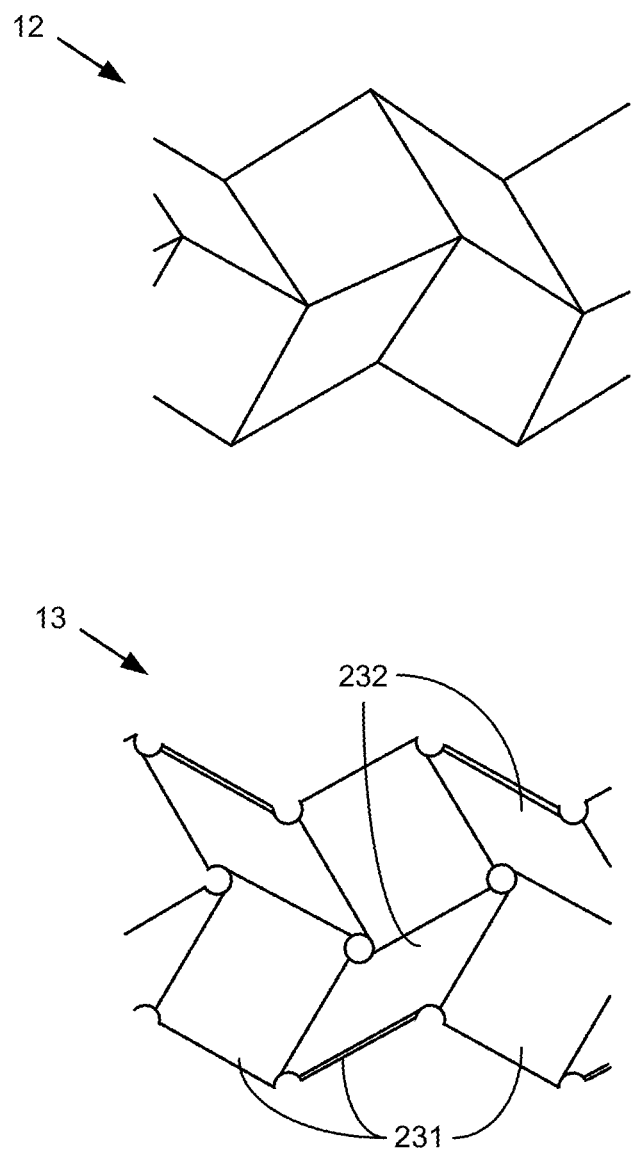
FIG. 4 is a diagram depicting developable double corrugated (DDC) surfaces generated using a woven design in accordance with various implementations described herein.

In an implementation, each row (or column) of a quadrilateral mesh origami pattern 12 can be treated as a weft strip 231 (or warp strip 232) in a woven structure 13 of DDC surfaces, as shown in FIG. 4. The weaving method utilized to construct the woven structure 13 shown in FIG. 4 can provide a general solution for decoupling the folds during the pre-creasing process, resulting in each fold being independent and the strip contracting uniaxially. In some cases, gluing can be optionally added to the woven structure 13 to enhance rigidity.

Origami Elements

Figure 5:
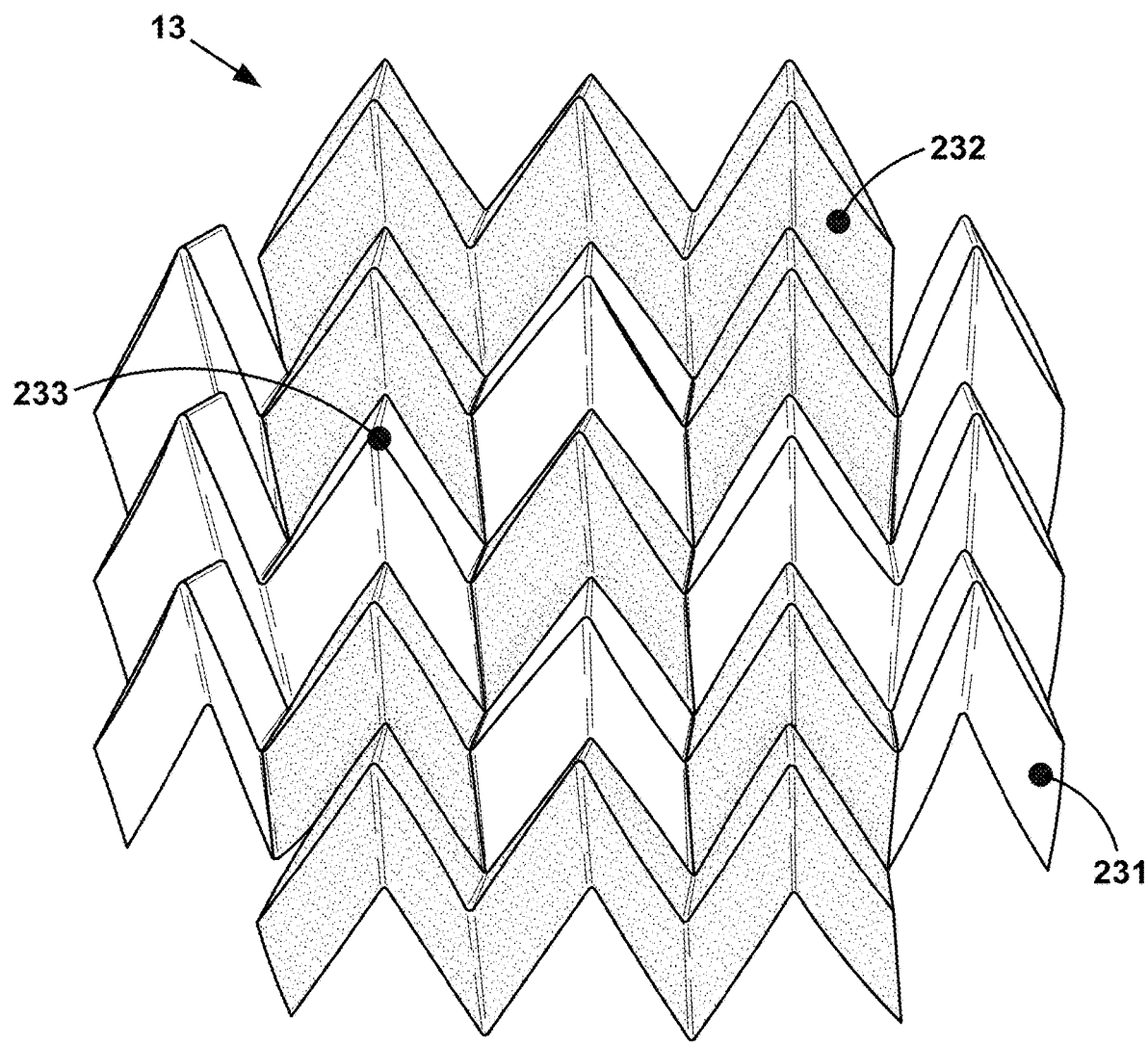
FIG. 5 is a diagram depicting an origami pattern created through a woven design containing internal vertices in accordance with various implementations described herein.
Figure 6:
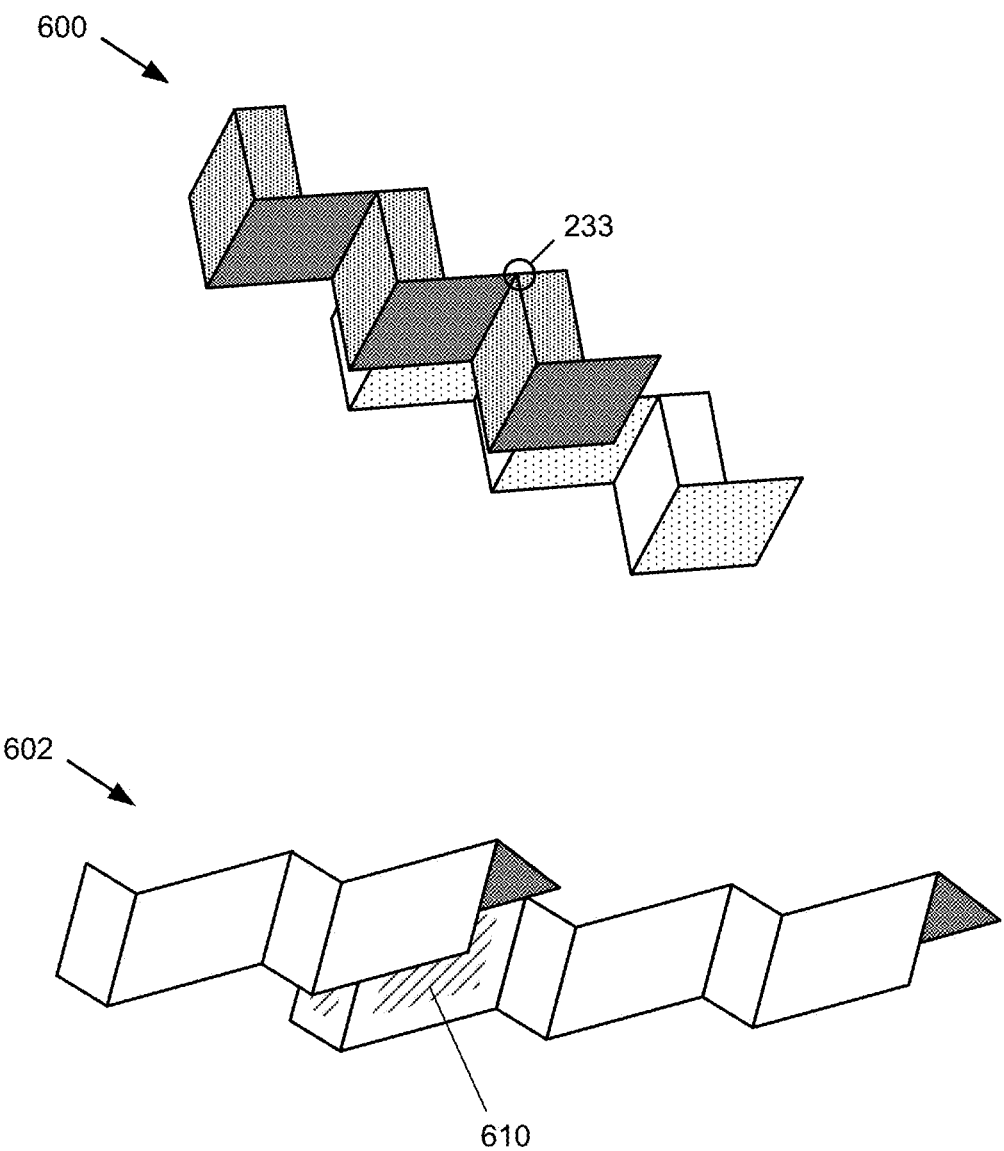
FIG. 6 is a diagram depicting stacking and bonding of origami strips in accordance with various implementations described herein.

As further shown in FIG. 5, internal vertices 233 can be added to weft strips 231 and/or warp strips 232 to enhance stability. For instance, with reference back to FIG. 1, the first creases 112 of the first linear sections 110 and the second creases 122 of the second linear sections 120 can define respective internal vertices on the first linear sections 110 and/or the second linear sections 120. Returning to FIG. 5, internal vertices 233 can be used, e.g., due to the structural compatibility between the weft strips 231 and warp strips 232 in the vicinity of internal vertices 233. As further shown by diagram 600 in FIG. 6, internal vertices 233 can provide a platform for stacking and bonding, allowing for the creation of longer strips, e.g., by stacking shorter origami strips using internal vertices 233 as supporting structures and bonding, e.g., via an adhesive 610 such as glue and/or other means, the shorter origami strips into a single, longer strip. Despite internal vertices 233 such as those shown in FIGS. 5-6 typically being avoided in conventional origami since they do not permit gluing, implementations as described herein can incorporate structures based on strips with internal vertices 233 because they can also form quadrilateral mesh origami tessellations through a woven design.

Figure 7:
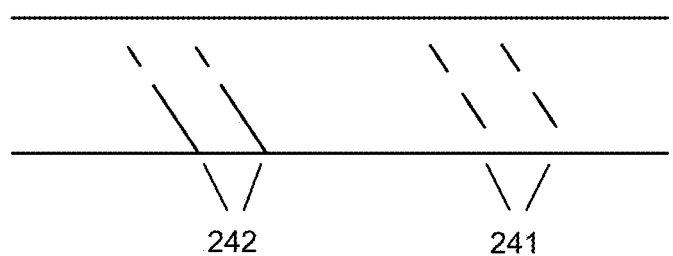
FIG. 7 is a diagram depicting an example crease pattern including notches that can be used in accordance with various implementations described herein.'
Figure 8:
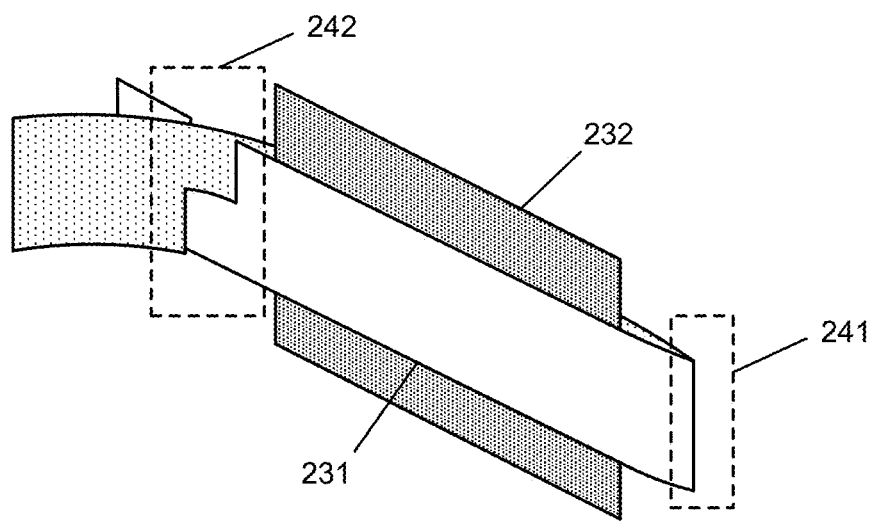
FIGS. 8-10 are diagrams depicting respective techniques for seaming edges of an origami structure in accordance with various implementations described herein.

Alternatively, to connect strips without glue, small notches can be used as shown by FIGS. 7-8. Notches, as defined herein, are cuts or slits made into a sheet material to facilitate easier and more precise folding. Often utilized in cardboard packaging manufacturing, such as boxes, notches can enable clean and accurate folds in the material. They can also create tabs and other structural features that hold material in place and enhance its strength and stability. As shown in FIG. 7, notches can include folding-assisting notches 241 and strength-enhancing notches 242. Other types of notches are also possible.

In woven origami designs, edges can be seamed to prevent the ends of origami strips from slipping off. Stated another way, a linear section or strip that is woven into a group of other linear sections or strips can be affixed to the group of sections or strips at opposing ends of that section or strip. One way of accomplishing this is via the notches 241-242 shown in FIG. 7.

FIG. 8 depicts an example of affixing a weft strip 231 to a warp strip 232 via the use of mated notches 242. More particularly, notches 242 are formed into opposing ends of a weft strip 231, e.g., at a first end of the weft strip 231 and a second end of the weft strip 231 that is opposite the first end. FIG. 8 further shows that the weft strip 231 can wrap around the warp strip 232, and the reserved notch 242 can be inserted into its corresponding mated notch 242, thereby locking the edge. Notching in this manner can be performed via the use of specialized machinery, but can also be performed manually, e.g., with a knife or other cutting tool. In an implementation, joining respective strips 231, 232 via notching as shown in FIG. 8 can be performed in response to the weft strip 231 being successfully woven into one or more warp strips 232. An example weaving process that can be utilized to facilitate this is described in further detail below with respect to FIG. 19.

Figure 9:
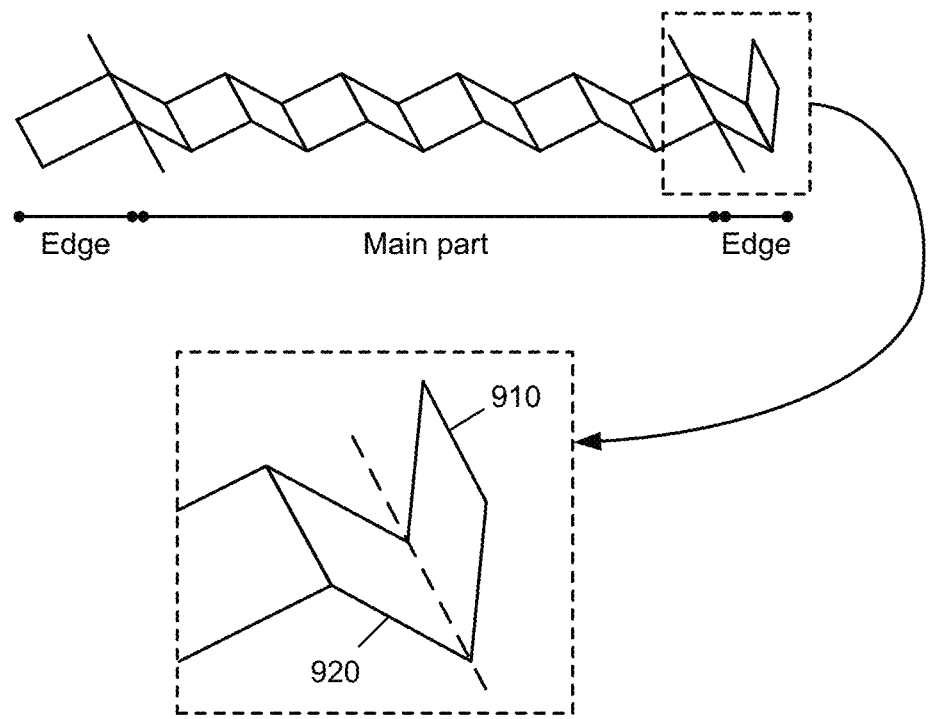
Figure 10:
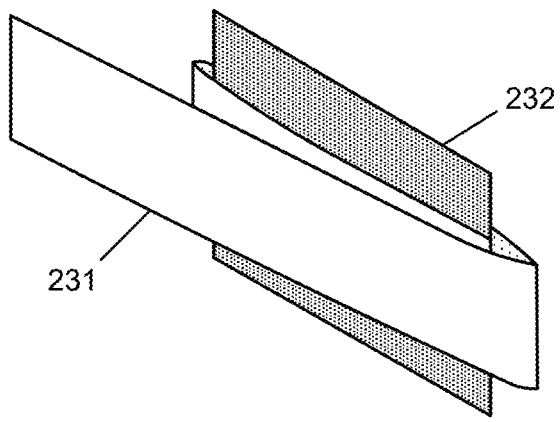

FIG. 9 illustrates another method for seaming the edges of an origami strip, in which an extra facet 910 is added for each strip boundary. As shown in FIG. 9, this extra facet 910 can correspond to an end segment of a given strip and can have reflective symmetry with a quadrilateral segment 920 of the strip that neighbors the extra facet 910. As further shown in FIG. 10, by winding a weft strip 231 including an extra facet 910 as shown in FIG. 9 around a warp strip 232, e.g., seaming the weft strip 231 with a circle back, a more stable structure can be established. The technique shown in FIG. 10 can also be employed to prevent the ends of the weft strip 231 from slipping off.

Figure 11:
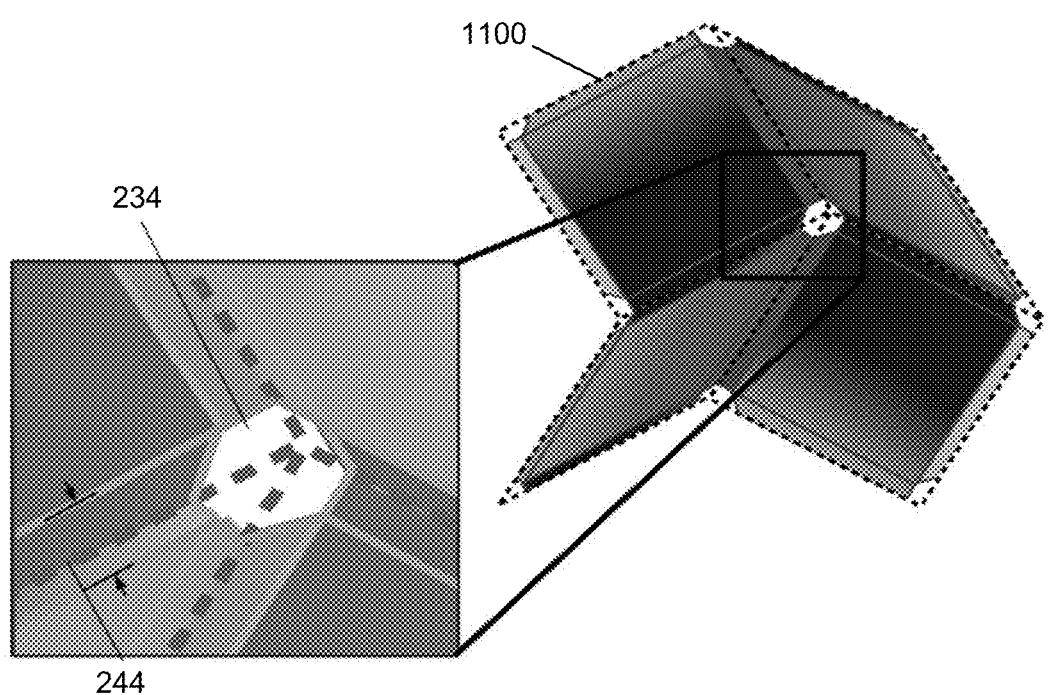
FIG. 11 is a diagram depicting an example origami unit cell with gaps surrounding internal vertices in accordance with various implementations described herein.

As additionally shown by FIG. 11, a gap 244 can be left between adjacent rows (and/or columns) in an origami mesh structure to facilitate bending the interwoven columns (and/or rows). The gaps 244 shown in FIG. 11 can create holes 234 at the vertices, which can be used to assist in folding the overall structure. Stated another way with reference to the structure 100 shown by FIG. 1, respective ones of the first linear sections 110 can be separated by first gaps (e.g., gaps 244 as shown in FIG. 11), the second linear sections 120 can be separated by second gaps (e.g., gaps 244), and these first gaps and second gaps can define openings (e.g., holes 234) in the resulting tessellated mesh structure.

FIG. 11 illustrates an example DDC unit cell 1100, and due to the presence of gaps 244 as shown in the magnified inset near an internal vertex of the unit cell 1100, intrinsic holes 234 are formed at the original geometric vertex positions. Holes 234 as used in this manner can be utilized to facilitate joining multiple sheets or strips via anchor structures, as will be described below with respect to FIGS. 15-16. Additionally, it is noted that the width used for the gap(s) 244 in a given structure can affect the overall stability of that structure.

Implementations

Figure 12:
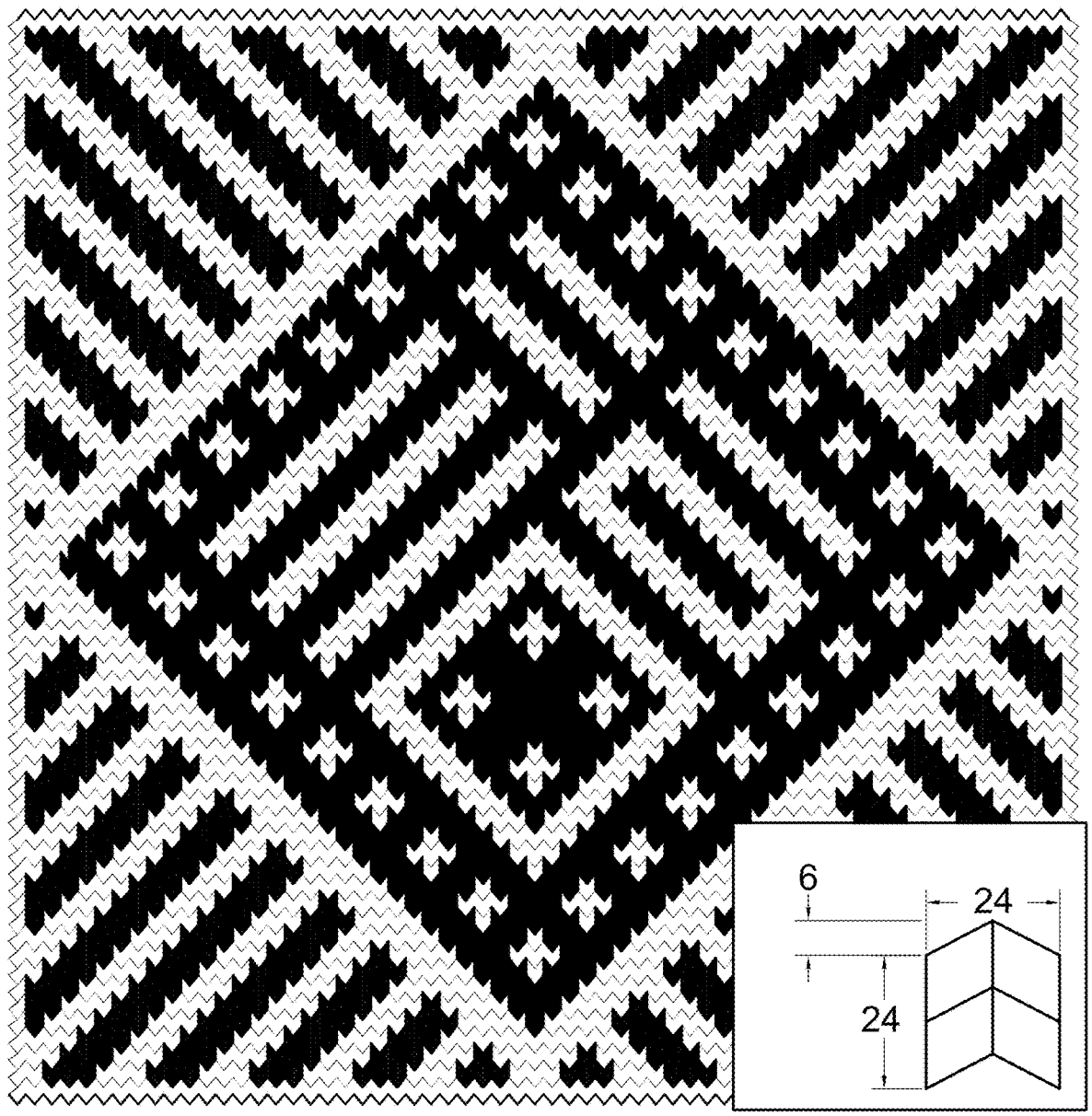
FIG. 12 is a diagram depicting an example origami tessellation pattern that can be constructed in accordance with various implementations described herein.
Figure 13:
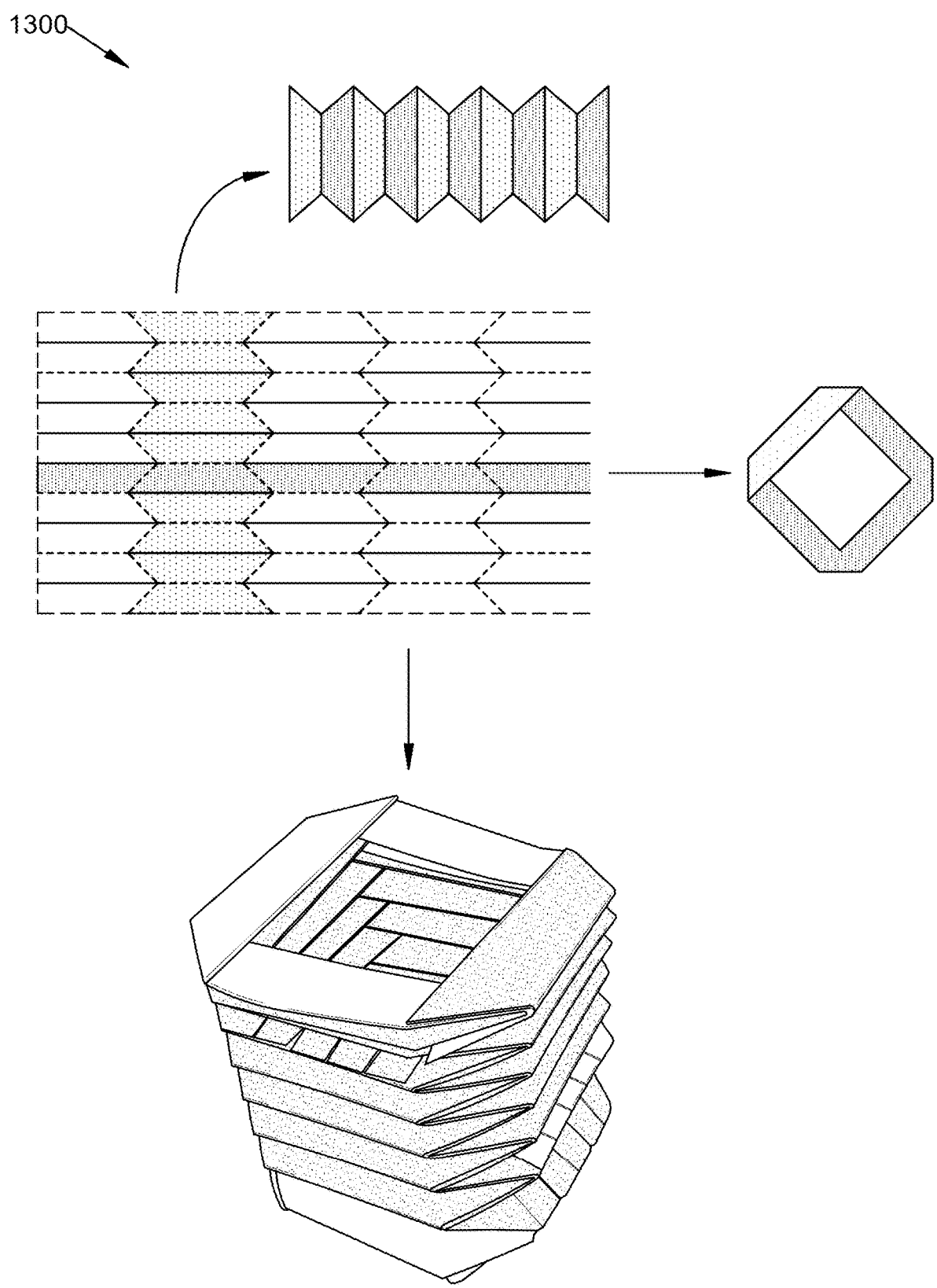
FIG. 13 is a diagram depicting an example cylindrical woven-based origami structure in accordance with various implementations described herein.
Figure 14:
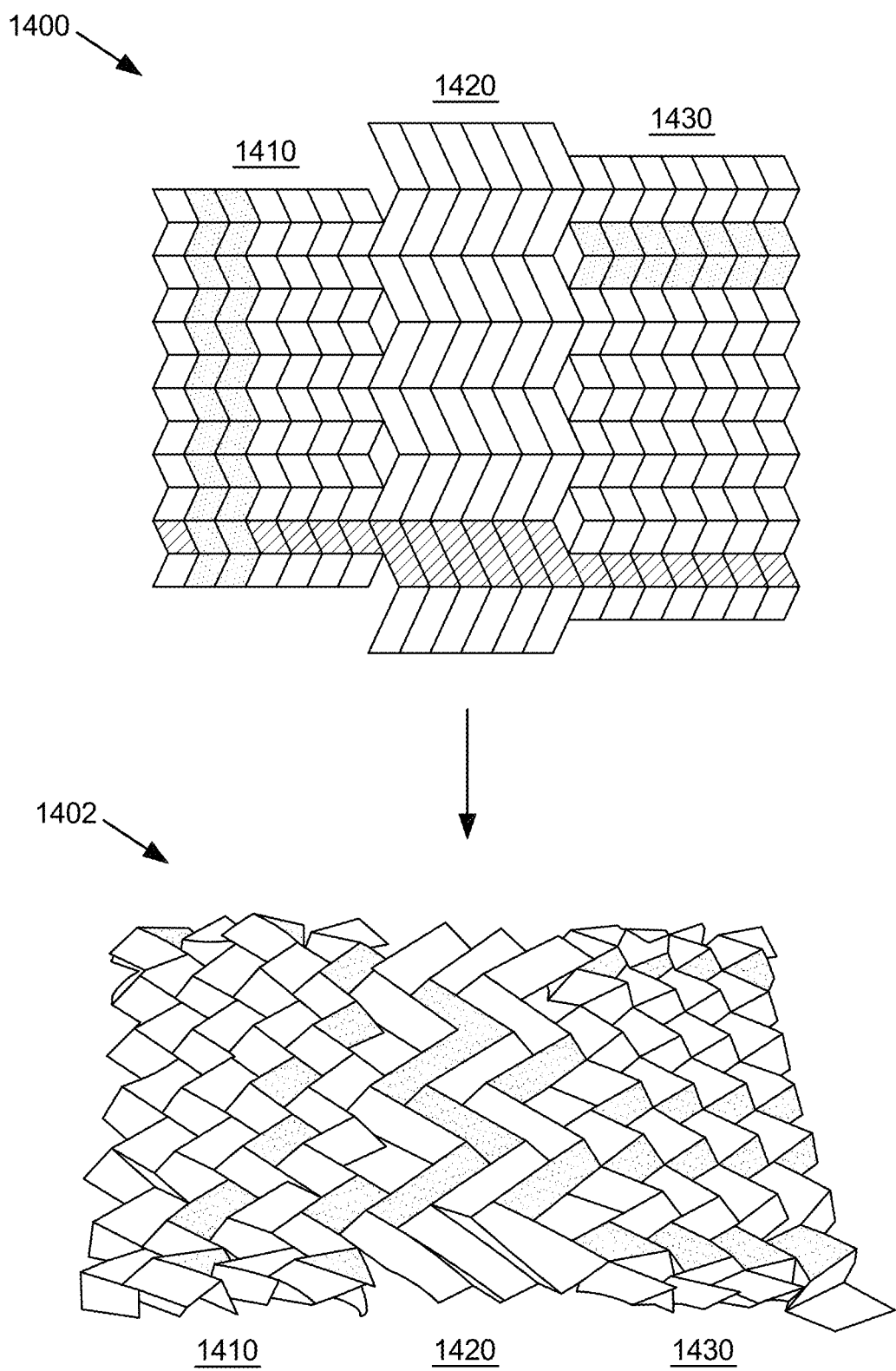
FIG. 14 is a diagram depicting an example woven-based origami pattern including basic unit cells with holes in accordance with various implementations described herein.

With reference now to FIGS. 12-14, implementations of the origami structures described above are provided to demonstrate the universality of the above-described techniques for producing quadrilateral mesh origami. Turning first to FIG. 12, an example structure is illustrated in which a Miura-ori tessellation with a "Fu" pattern (e.g., representing the Chinese character Fu, meaning "blessing") is woven using a group of Miura-ori unit cells that are produced as described above. The inset shown in FIG. 12 displays a magnified view of the pixelated design, where each pixel represents a unit cell of the tessellation.

In the example shown by FIG. 12, internal vertices exist in the strips to enhance stability. Additionally, it is noted that the structure shown in FIG. 12 is not a typical plain weaving texture but instead employs a patterned weaving structure. This shows that the techniques described herein are not limited to plain textures, but could also be applied to twill textures, satin textures, and/or an even wider variety of textures.

Woven origami techniques as described herein can also facilitate the development of additional origami patterns. For example, FIG. 13 illustrates a three-dimensional Tachi-Miura cylindrical structure, which can be produced via a woven design in which vertices are inherently removed to reduce energy dissipation. The example shown in FIG. 13 demonstrates that even for geometric cylinders, the techniques described herein can be applied provided that all faces are quadrilateral.

Turning to FIG. 14, a woven pattern 1400 featuring $BCH_2$ (Basic unit Cell with Hole and cell size ratio 2) is shown, which can facilitate the connection of large and small unit cells, e.g., small unit cells associated with sections 1410 and 1430 and large unit cells associated with section 1420. FIG. 14 further shows a three-dimensional structure 1402 resulting from the pattern 1400, which illustrates that even if an origami tessellation does not achieve a densely packed configuration, the techniques described herein can be applied provided that all faces are quadrilateral, e.g., in a similar manner to the example shown by FIG. 13.

Stacked Quadrilateral Mesh Origami Tessellation Surfaces Through Woven Designs

Assembling DDC surfaces can be used as a technique for constructing rigid foldable origami meta-structures. However, from a manufacturing standpoint, binding the creases from different layers in stacked DDC surfaces can be challenging due to the existence of only point or line contact. Accordingly, implementations described herein can address this issue via a woven approach, an example of which is illustrated by FIGS. 15-16.

Figure 15:
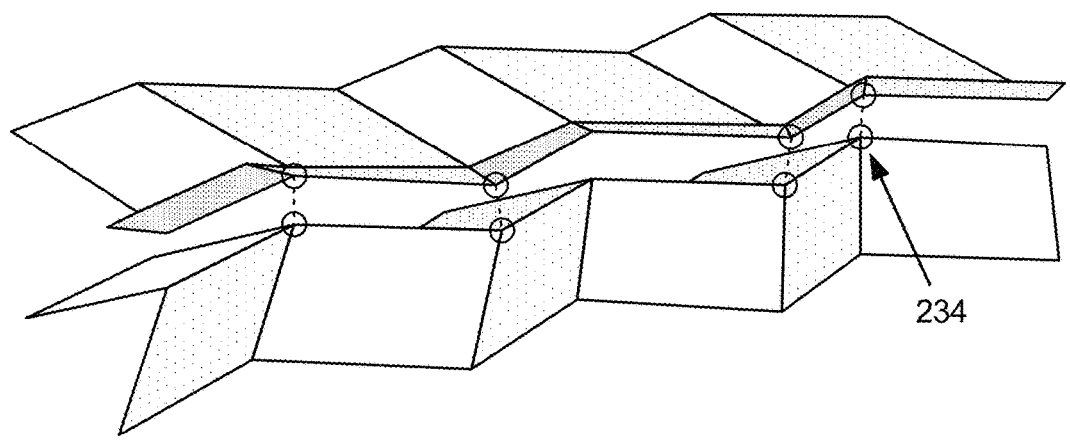
FIGS. 15-16 are diagrams depicting example stacked quadrilateral mesh origami tessellations employing a woven structure in accordance with various implementations described herein.

With reference first to FIG. 15, woven DDC surfaces can create openings or holes 234 at respective vertices, e.g., as described above with respect to FIG. 11. These holes 234 can function as anchor points for affixing respective layers of woven surfaces together via anchor structures 235, as depicted in FIG. 16. While FIG. 16 illustrates an example in which surfaces are bound together through sewing and the anchor structures 235 include thread, it is noted that any other suitable structure(s) and/or material(s) for joining together multiple disparate layers could also be used.

Figure 16:
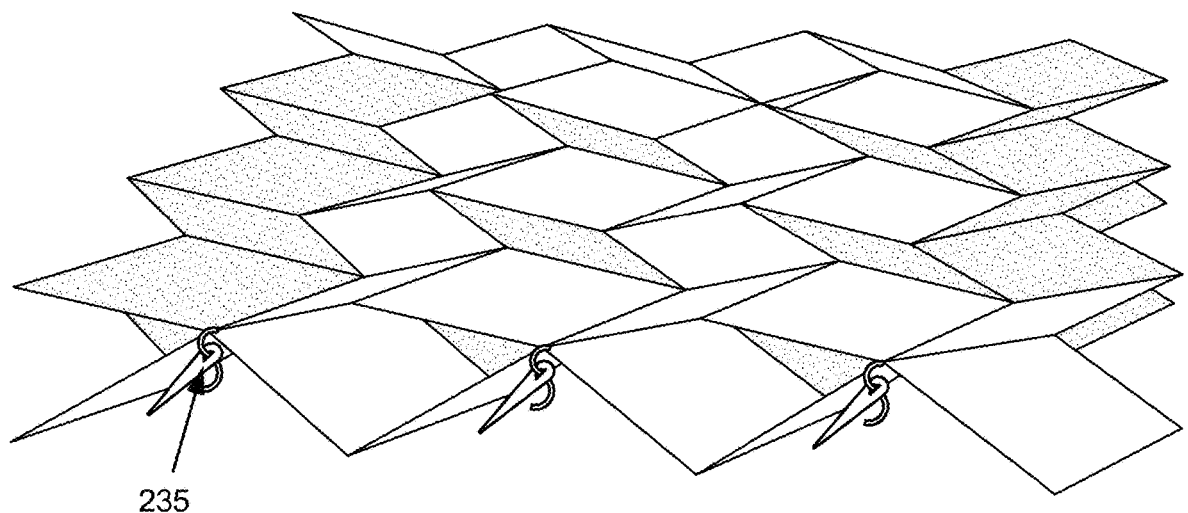

To summarize the anchoring approach shown by FIGS. 15-16, respective strips and/or layers of a foldable material can be positioned such that there are gaps between respective adjacent strips and/or layers, e.g., as described above with respect to FIG. 11. As further described above with respect to FIG. 11, respective strips can then be woven together, resulting in the gaps between the strips defining openings 234 in a resulting tessellated mesh structure, e.g., as shown in FIG. 15. Subsequently, as shown in FIG. 16, the strips and/or layers can be connected to each other via anchor structures 235 that are inserted into the openings 234 formed in the tessellated mesh structure.

Fabrication Processes

Implementations described herein facilitate creation of quadrilateral mesh origami tessellations via woven patterns in a manner that leverages properties of traditional weaving, which can allow for mass production of woven origami structures. Traditional weaving, whether executed manually or by machine, can include respective steps that collaboratively produce a final fabric product. Initial procedures such as warping and sizing can prepare a loom for weaving, where warp yarns are wound onto a beam or roller and threaded through heddles and reed to manage tension and spacing. Sizing is a process that involves applying a sizing agent to warp yarns to enhance their strength and prevent breakage during weaving.

Figure 17:
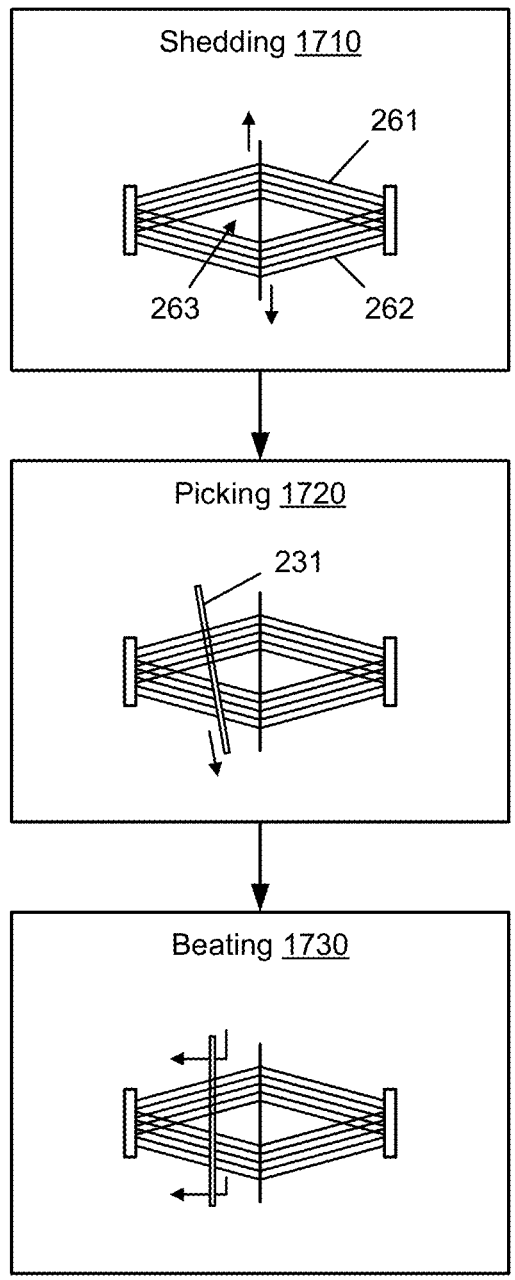
FIG. 17 is a flow diagram of an example weaving process for origami structures in accordance with various implementations described herein.

As shown by diagram 1700 in FIG. 17, an example weaving process can include three primary motions: shedding 1710, picking 1720, and beating 1730. Additional secondary motions, such as warp let-off and cloth take-up, can also be used to facilitate continuous weaving. Post-weaving, the fabric can undergo supplementary processes like washing, dyeing, or printing to attain the desired properties or appearance.

As shown by FIG. 17, the three primary motions of 1710, picking 1720, and beating 1730 can be extended to facilitate weaving of origami structures, thereby enabling a novel and inventive means of producing intricate origami-inspired structures through mass-production techniques that are similar to those used in conventional weaving. More particularly, during shedding 1710, warp strips 232, e.g., as shown by FIGS. 4-5, can be separated into two groups 261 and 262. This can create an opening, referred to as a shed 263, for inserting a weft strip 231. During picking 1720, the weft strip 231 can be placed into the shed 263. During beating 1730, the newly inserted weft strip 231 can be pushed into the completed section of the woven quadrilateral mesh origami tessellation, here indicated as being to the left of the shed 263.

Figure 18:
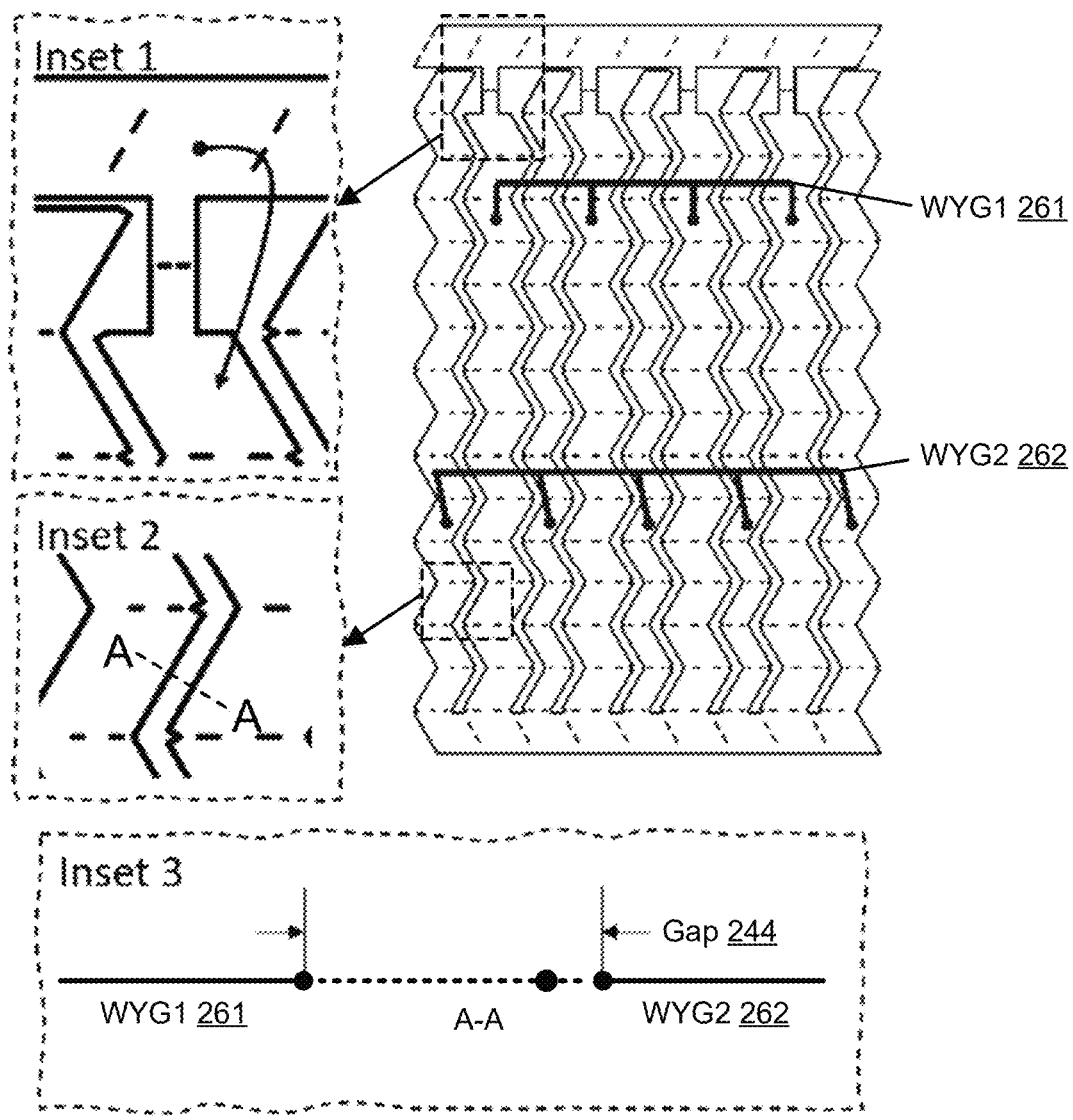
FIG. 18 is a diagram depicting an example warp material pattern for woven-based origami in accordance with various implementations described herein.

Turning next to FIG. 18, a non-limiting example paper structure that can be woven using the process shown in FIG. 17 is illustrated. It is noted, however, that FIG. 18 is intended merely as an example of a structure that could be used, and other structures are also possible. As shown in FIG. 18, laser cutting was employed to prepare warp yarns using paper, dividing them into two groups (denoted in FIG. 18 as Warp Yarn Group 1 (WYG1) 261 and Warp Yarn Group 2 (WYG2) 262), where WYG1 261 is connected and WYG2 262 is unconnected. Notches 241, such as those described above with respect to FIG. 7, are integrated into the cutting pattern to facilitate the folding process. The section connecting the first group of warp yarns can be glued to the main part after weaving, and gaps 244 can be introduced to avoid collisions among distinct warp threads 232 during shedding. As shown in FIG. 18, gaps 244 can be situated predominantly on the side of WYG2 262, rendering WYG2 262 narrower than WYG1 261 and consequentially reducing the likelihood of interference with WYG1 261.

With regard to the insets shown in FIG. 18, inset 1 illustrates a section for connecting WYG1 261, which can be adhered to the main part after weaving. Inset 2 displays an enlarged image of the gap 244, and inset 3 depicts the cross-section where the majority of gaps originate from the side of WYG2 262, causing WYG2 262 to be narrower than WYG1 261.

Figure 19:
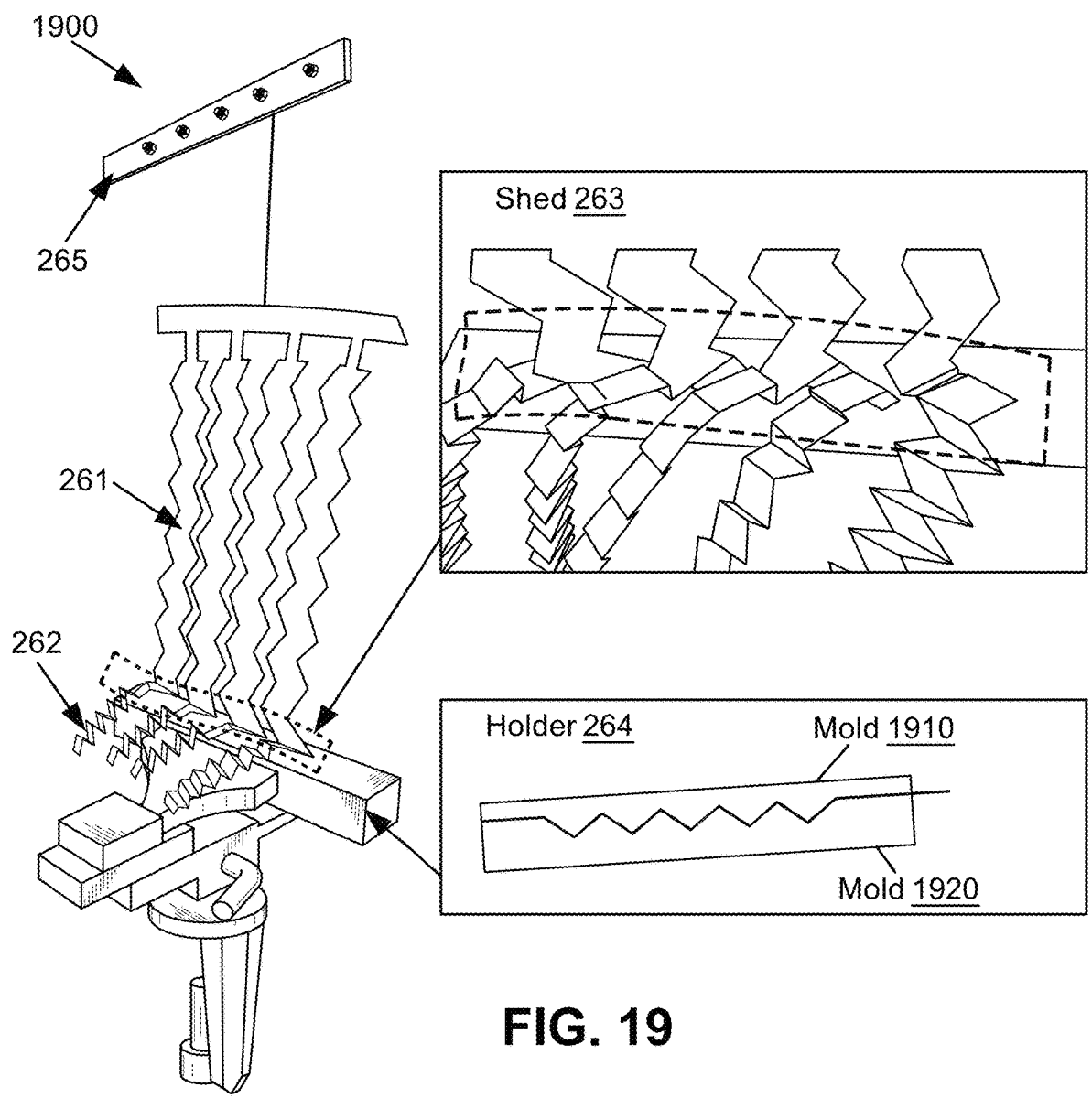
FIG. 19 is a diagram depicting an example apparatus that facilitates woven-based origami in accordance with various implementations described herein.

Referring now to FIG. 19, an example apparatus 1900 that facilitates weaving the structure shown in FIG. 18 is illustrated. As shown in FIG. 19, to secure the warp yarns on apparatus 1900, pre-creased warps can be fastened using a holder 264 and drop hanger 265. A shed 263 produced by separating WYG1 261 and WYG2 262 is shown in the upper inset, and a detailed view of the holder 264, made of respective molds 1910 and 1920, is shown in the lower inset.

Figure 20:
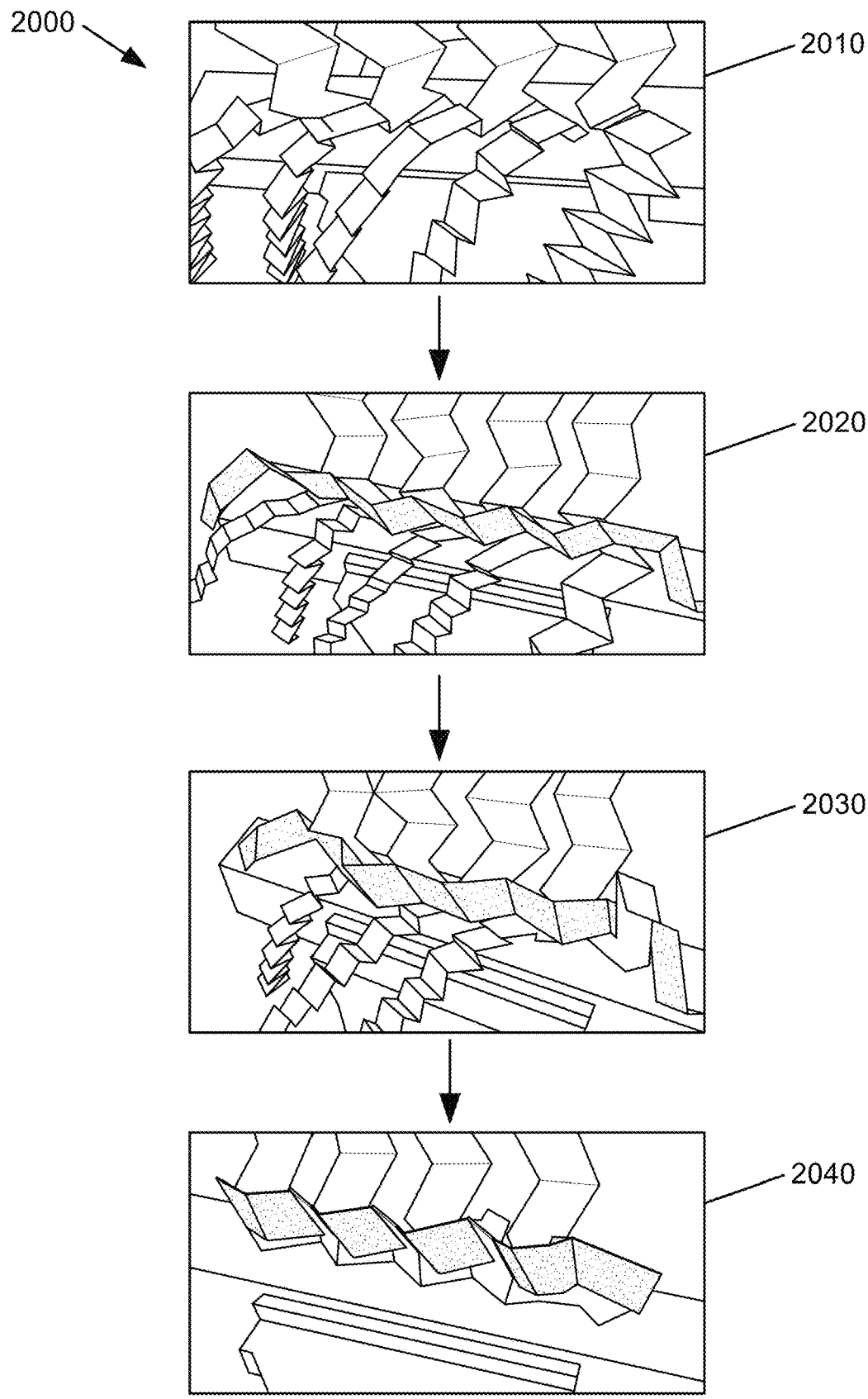
FIG. 20 is a diagram depicting an example origami weaving technique in accordance with various implementations described herein.

FIG. 20 illustrates respective steps of a weaving process 2000 that can be performed via apparatus 1900. In step 2010, the warp yarns, e.g., WYG1 261 and WYG2 262, can be attached to the loom and separated to create a shed 263. In step 2020, after attaching the warp yarns to the loom, a pre-creased weft yarn can be inserted into the shed 263 formed by the pre-creased warp yarns. Subsequently, in step 2030, all floating yarns (e.g., WYG2 162) on the opposite side can be lifted, either manually or with tools, and the weft yarn 231 can be naturally secured by the warp yarns. Finally, at step 2040, the edges of the sample can be seamed through gluing, using notches, and/or other techniques, and the shape can be adjusted during the weaving process. The motions of the weaving process 2000 shown in FIG. 20 can then be repeated for additional weft yarns, which can ultimately produce a woven Miura-ori structure, e.g., similar to the woven structure 13 shown in FIG. 5.

With regard to the weaving process 2000 shown in FIG. 20, it is noted worth noting that although some warp strips, e.g., WYG2 262, can be situated such that one end of the respective strips are floating, the weaving process 2000 could also be applied in situations where both ends of all warps 232 are fixed.

It is further noted that weaving is a complex process, and numerous factors can influence both the processing and performance of the final product. For instance, the type of loom employed, the properties of the material being woven, and/or other factors can considerably affect the process. For instance, if the material is too rigid, it may lack the necessary flexibility to bend into a desired shape. Conversely, if the material is too soft, it may not possess adequate plasticity for effective pre-creasing, rendering a desired origami structure unattainable. The geometric characteristics of the woven strip, such as the length of creases and sector angles, can also impact the weaving process. Other factors during weaving, like yarn tension, weaving speed, and the weaving technique employed, can further influence the performance of the final product. Therefore, these and/or other factors can be considered in connection with the weaving process 2000 to facilitate optimization.

To summarize the above, implementations described herein can facilitate methods to weave strips into quadrilateral mesh origami tessellations through the process steps shown in FIG. 17, e.g., shedding 1710, which divides the two groups of warps; picking 1720, which is responsible for inserting the wefts; and beating 1730, which adjusts the placement of the wefts. Incorporation of these primary motions can allow for the creation of complex, origami-inspired structures using mass-production capabilities similar to those used in traditional weaving, which can represent significant advancements in the field of textile manufacturing.

Applications of Woven-Based Quadrilateral Mesh Origami Tessellation Surfaces

Figure 21:
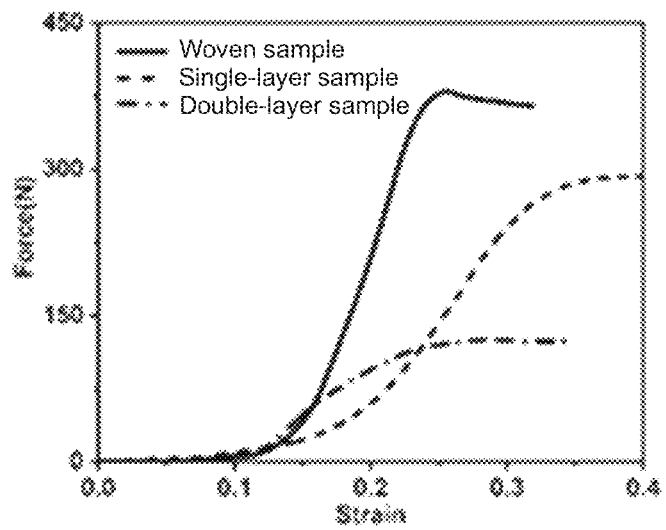
FIGS. 21-22 are diagrams depicting performance characteristics of an example woven-based origami structure in accordance with various implementations described herein.
Figure 22:
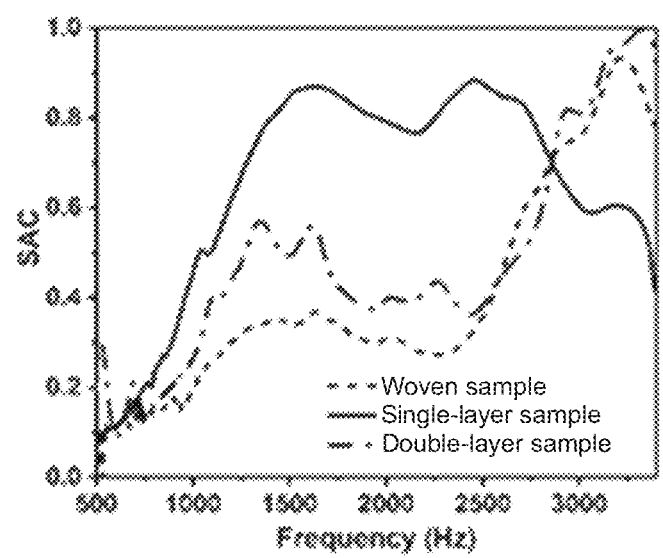

Woven-based quadrilateral mesh origami tessellations can have many applications as functional materials, examples of which are now described with respect to FIGS. 21-22. Origami tessellations have garnered considerable attention due to their unique properties, rendering them suitable as building blocks for a wide array of applications such as energy absorption, acoustic insulation, and lightweight structures. For instance, a woven tessellated mesh structure as described herein can provide energy absorption and/or mechanical support functionality by distributing compressive force applied to an object that includes the tessellated mesh structure, resulting in increased resilience of the object to the compressive force. As another example, a woven tessellated mesh structure as described herein can be applied to a surface, resulting in the tessellated mesh structure absorbing sound waves impinging on the surface. Other examples are also possible.

Example applications utilizing woven-based quadrilateral mesh origami tessellations are presented below. It is noted, however, that the applications provided herein are intended merely as a non-exhaustive listing of functions that can be performed by structures constructed according to techniques as described herein and are not limited to the two illustrated applications. Indeed, any other functional materials that could be based on woven-based quadrilateral mesh origami tessellations as described herein are also intended to fall within the scope of this disclosure and the claimed subject matter.

In the examples shown by FIGS. 21-22, the performance of an example woven-based quadrilateral mesh origami tessellation is assessed through tests involving three samples-a woven-based sample, a single-layer sample, and a double-layer sample. Paper was used to construct each of these samples. The woven-based sample was fabricated by weaving a single sheet of paper to form a quadrilateral origami tessellation 12, here a Miura-ori, using the techniques described above. The single-layer structure was formed by folding a single sheet of paper into the same origami tessellation without weaving. The double-layer structure, consisting of two directly folded samples, was produced by stacking two single layers together.

Implementation: Mechanical Support

As shown in FIG. 21, a compression test was conducted to measure the compressive strength of the three samples described above. The compression test was performed using a universal testing machine, in which a sample is placed on a holder and covered with a square glass plate to ensure uniform pressure. Subsequently, a press was slowly lowered at a slow speed to evaluate the mechanical support performance of the samples.

The compression test was carried out with a displacement loading rate of 1 mm/min, and the displacement and strain of the specimen were documented by the testing system, as shown in FIG. 21. As shown in FIG. 21, the maximum force of the woven-based Miura-ori sample was approximately 23.45% greater than that of the double-layer specimen, suggesting that the woven-based folding structure offers enhanced resistance to compression forces compared to the double-layer structure. At a displacement of 0.25 strain, the compression force for the woven-based sample was 2.65 times the force for the single-layer sample, demonstrating the superior compressive strength of the woven-based folding structure.

It is noted that the double-layer sample shown in FIG. 21 is thicker than the single-layer sample, thereby providing better mechanical support performance. Although the thickness of the double-layer sample is comparable to that of the woven-based sample, its mechanical support performance is inferior. The outcomes of these tests underscore the exceptional mechanical properties of the woven-based folding structure, rendering it a promising foundation for a diverse range of applications, such as energy absorption and lightweight structures.

Implementation: Sound Absorption

As shown in FIG. 22, the sound absorption performance of the samples from the mechanical support test as described above was appraised by examining the samples in an impedance tube. The testing setup entailed stationary random frequency sound waves emitted by a speaker impinging upon the samples, with two microphones capturing the reflected sound signal.

FIG. 22 shows the results of the sound absorption testing, where a sound absorption coefficient (SAC) was calculated to quantify the noise reduction capacity of the respective materials. As shown, the sound absorption peaks for the woven-based sample reached 0.87 at approximately 1600 Hz and 2400 Hz, signifying exceptional sound absorption properties across an extensive frequency range. Additionally, it is noted that the acoustic absorption bandwidth of the woven-based sample was considerably larger than that of the one-piece molded samples, and the peak value was also shifted to a lower frequency. This finding indicates that the woven-based structure offers superior sound absorption performance in comparison to traditional folding techniques. The results of these tests highlight the potential of the woven-based quadrilateral mesh origami tessellation as a material for acoustic insulation applications.

Methods

Figure 23:
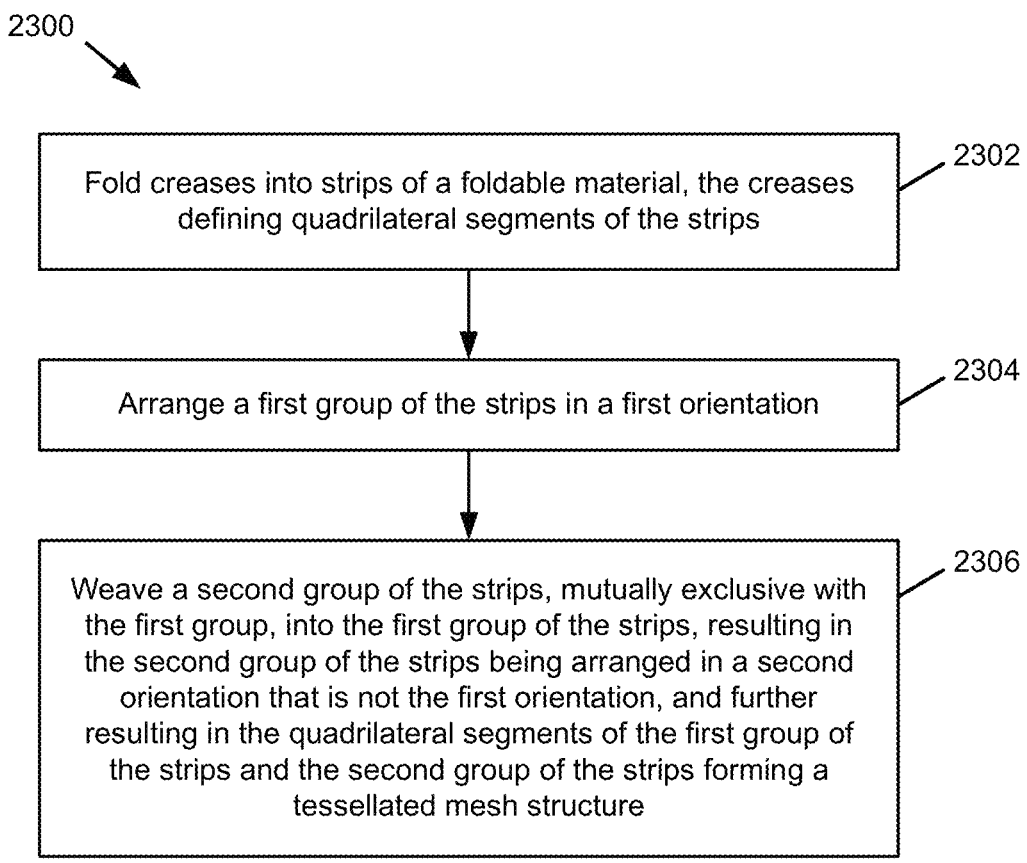
FIGS. 23-24 are flow diagrams of respective methods facilitating woven quadrilateral mesh origami structures in accordance with various implementations described herein.

Turning now to FIG. 23, a flow diagram of a method 2300 that facilitates woven quadrilateral mesh origami structures is illustrated. At 2302, creases (e.g., creases 112 and 122 as shown in FIG. 1) can be folded into strips of a foldable material (e.g., linear sections 110 and 120, respectively, as shown in FIG. 1), such that the creases define quadrilateral segments of the strips.

At 2304, a first group of the strips (e.g., warp strips 232) can be arranged in a first orientation. Subsequently, at 2306, a second group of the strips (e.g., weft strips 231), mutually exclusive with the first group of the strips, can be woven into the first group of the strips, resulting in the second group of the strips being arranged in a section orientation that is not the first orientation, and further resulting in the quadrilateral segments of the first group of the strips and the second group of the strips forming a tessellated mesh structure.

In an implementation, weaving can be performed at 2306 via a shedding step (e.g., shedding step 1710), in which the first group of the strips are separated into a first subgroup (e.g., WYG1 261) and a second subgroup (e.g., WYG2 262) separated by an opening (e.g., shed 263); a picking step (e.g., picking step 1720), in which respective ones of the second group of the strips are inserted into the opening, resulting in inserted strips, and a beating step (e.g., beating step 1730), in which the inserted strips are moved into the tessellated mesh structure.

Figure 24:
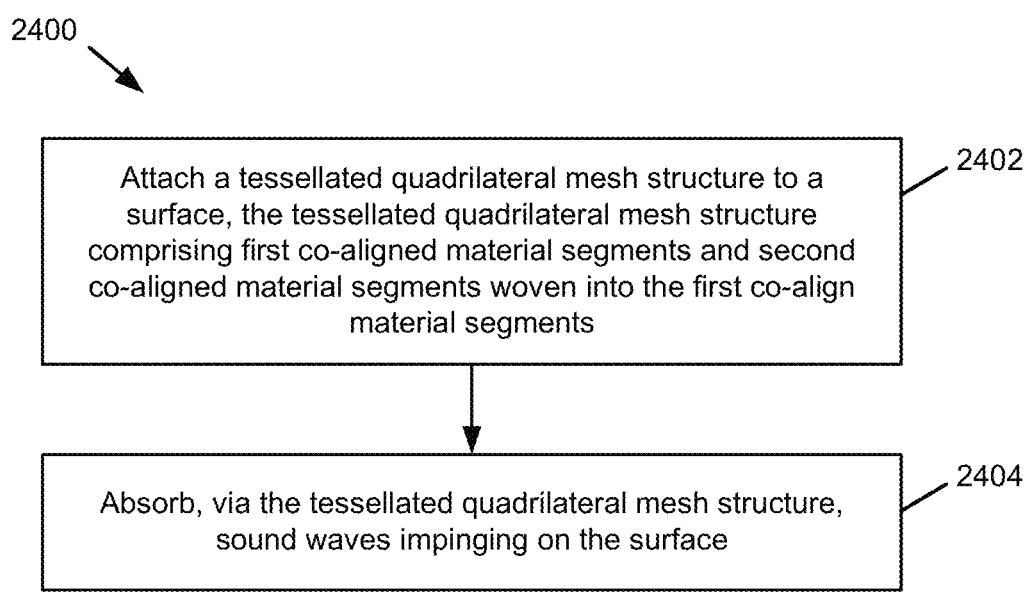

With reference next to FIG. 24, a flow diagram of a method 2400 that facilitates woven quadrilateral mesh origami structures is illustrated. At 2402, a tessellated quadrilateral mesh structure (e.g., corresponding to a woven structure 13) a can be affixed and/or otherwise attached to a surface. The tessellated quadrilateral mesh structure can include first co-aligned material segments (e.g., linear sections 110) and second co-aligned material segments (e.g., linear sections 120) that are woven into the first co-aligned material segments.

At 2404, sound waves impinging on the surface can be absorbed via the tessellated quadrilateral mesh structure.

FIGS. 23-24 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
    first linear sections of a foldable material positioned in a first orientation, the first linear sections comprising first creases formed into the first linear sections that define first quadrilateral segments of the first linear sections; and
    second linear sections of the foldable material that are positioned in a second orientation that is not the first orientation and woven into the first linear sections, resulting in the second linear sections being placed adjacent to first surfaces of alternating sections of the first linear sections and second surfaces, opposite the first surfaces, of other sections, other than the alternating sections, of the first linear sections,
    wherein the second linear sections comprise second creases formed into the second linear sections that define second quadrilateral segments of the second linear sections, and
    wherein the second linear sections being woven into the first linear sections results in the first quadrilateral segments of the first linear sections and the second quadrilateral segments of the second linear sections forming a tessellated mesh structure.

2. The device of claim 1, wherein the first orientation is perpendicular or substantially perpendicular to the second orientation.

3. The device of claim 1, wherein the first linear sections are separated by first gaps, wherein the second linear sections are separated by second gaps, and wherein the first gaps and the second gaps define openings in the tessellated mesh structure.

4. The device of claim 3, further comprising:
    anchor structures, positioned into the openings of the tessellated mesh structure, that fix respective first ones of the first linear sections to respective second ones of the second linear sections.

5. The device of claim 1, wherein the second linear sections are affixed to the first linear sections at first ends of the second linear sections and second ends of the second linear sections that are opposite the first ends.

6. The device of claim 5, wherein first notches are formed into respective sections of the first linear sections, wherein second notches are formed into the first ends and the second ends of the second linear sections, and wherein the second linear sections are affixed to the first linear sections via the first notches and the second notches.

7. The device of claim 5, wherein the second linear sections comprise end segments located at the first ends and the second ends of the second linear sections, wherein the end segments are reflectively symmetrical to the second quadrilateral segments, and wherein the end segments are wrapped around the first linear sections, resulting in the second linear sections being affixed to the first linear sections.

8. The device of claim 1, wherein the first creases and the second creases define respective internal vertices on linear sections selected from a group consisting of the first linear sections and the second linear sections.

9. The device of claim 1, wherein the tessellated mesh structure is applied to a surface, resulting in the tessellated mesh structure absorbing sound waves impinging on the surface.

10. The device of claim 1, wherein the tessellated mesh structure facilitates resistance to a compressive force applied to the device, resulting in increased resilience of the device to the compressive force.

11. A method, comprising:
    folding creases into first strips and second strips of a foldable material, wherein the creases define first quadrilateral segments of the first strips and second quadrilateral segments of the second strips;
    arranging the first strips in a first orientation; and
    weaving respective ones of the second strips into the first strips, resulting in the second strips being arranged in a second orientation that is not the first orientation and placed adjacent to first surfaces of alternating sections of the first strips and second surfaces, opposite the first surfaces, of other sections, other than the alternating sections, of the first strips, and further resulting in the first quadrilateral segments of the first strips and the second quadrilateral segments of the second strips forming a tessellated mesh structure.

12. The method of claim 11, wherein:
    the arranging of the first strips comprises placing first gaps between respective first ones of the first strips,
    the weaving comprises placing second gaps between respective second ones of the second strips, and
    the first gaps and the second gaps define openings in the tessellated mesh structure.

13. The method of claim 12, further comprising:
    connecting the first ones of the first strips to the second ones of the second strips via anchor structures inserted into the openings in the tessellated mesh structure.

14. The method of claim 11, wherein the weaving comprises:
    separating the first strips into a first subgroup and a second subgroup, the first subgroup and the second subgroup being separated by an opening;
    inserting respective ones of the second strips into the opening, resulting in inserted strips; and
    moving the inserted strips into the tessellated mesh structure.

15. The method of claim 11, further comprising:
    inserting notches into respective ones of the first strips and the second strips; and
    in response to the weaving being completed, affixing respective first ones of the first strips to respective second ones of the second strips via the notches.

16. The method of claim 11, further comprising:
    in response to the weaving being completed, affixing the second strips to the first strips at first ends of respective ones of the second strips and second ends, opposite the first ends, of the respective ones of the second strips.

17. The method of claim 11, further comprising:
    affixing the tessellated mesh structure to a surface, resulting in absorption of sound waves impinging on the surface.

18. A method, comprising:
    forming a tessellated quadrilateral mesh structure, comprising:
        forming creases into first co-aligned material segments and second co-aligned material segments, the creases defining first quadrilateral regions of the first co-aligned material segments and second quadrilateral regions of the second co-aligned material segments; and weaving respective ones of the second co-aligned material segments into the first co-aligned material segments, resulting in the second co-aligned material segments being placed adjacent to first surfaces of alternating sections of the first co-aligned material segments and second surfaces, opposite the first surfaces, of other sections, other than the alternating sections, of the first co-aligned material segments, and further resulting in the tessellated quadrilateral mesh structure;

attaching the tessellated quadrilateral mesh structure to a surface; and absorbing, via the tessellated quadrilateral mesh structure, sound waves impinging on the surface.

19. The method of claim 18, wherein respective first ones of the first co-aligned material segments are affixed to respective second ones of the second co-aligned material segments.

20. The method of claim 11, further comprising:

applying the tessellated mesh structure to a surface of an object; and distributing, via the tessellated mesh structure, a compressive force applied to the object, resulting in increased resilience of the object to the compressive force.

* * * * *